(12) United States Patent
Staten et al.

(10) Patent No.: US 7,671,858 B1
(45) Date of Patent: Mar. 2, 2010

(54) UNCONSTRAINED PAVING AND PLASTERING METHOD FOR GENERATING FINITE ELEMENT MESHES

(75) Inventors: Matthew L. Staten, Albuquerque, NM (US); Steven J. Owen, Albuquerque, NM (US); Teddy D. Blacker, Albuquerque, NM (US); Robert Kerr, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 754 days.

(21) Appl. No.: 11/515,978

(22) Filed: Sep. 5, 2006

Related U.S. Application Data

(60) Provisional application No. 60/714,502, filed on Sep. 6, 2005.

(51) Int. Cl.
*G06T 15/00* (2006.01)
(52) U.S. Cl. ............... 345/423; 345/419; 345/428; 703/2
(58) Field of Classification Search ........... 345/423, 345/428; 703/2
See application file for complete search history.

(56) References Cited

U.S. PATENT DOCUMENTS

| | | | |
|---|---|---|---|
| 6,317,704 B1 * | 11/2001 | Furuhata et al. ............ 703/2 |
| 6,578,189 B2 * | 6/2003 | Hariya et al. .............. 716/20 |
| 6,625,938 B1 * | 9/2003 | Shimada et al. ........... 52/81.1 |
| 6,804,635 B1 * | 10/2004 | Dhondt ..................... 703/2 |
| 7,050,951 B1 * | 5/2006 | Tautges et al. ............. 703/2 |
| 7,098,912 B1 * | 8/2006 | Borden et al. ............. 345/423 |
| 7,181,377 B1 * | 2/2007 | Borden et al. ............. 703/2 |
| 7,219,039 B1 * | 5/2007 | Shepherd et al. ........... 703/2 |
| 7,339,584 B1 * | 3/2008 | Shepherd et al. ........... 345/423 |

OTHER PUBLICATIONS

Abaqus, "Abaqus Analysis User's Manual", *Version 6.5, Section 14.1.1, Hibbit, Karlsson & Sorrensen: USA,* (2005).
ASME, "Hexahedra Conformability, Trends in Unstructured Mesh Generation", *AMD* vol. 220, (1997), 123-129.
Benzley, S. E., et al., "A Comparison of All-Hexahedral and All-Tetrahedral Finite Element Meshes for Elastic and Elasto-Plastic Analysis", *Proc. 4th Int. Meshing Roundtable,* (1995), 179-191.
Bern, M., "Flipping Cubical Meshes", *Proc. 10th International Meshing Roundtable,* (2001), 19-29.
Blacker, T. D., et al., "Paving: A New Approach to Automated Quadrilateral Mesh Generation", *International Journal for Numerical Methods in Engineering,* 32, (1991), 811-847.
Blacker, T. D., et al., "Seams and Wedges in Plastering: A 3D Hexahedral Mesh Generation Algorithm", *Engineering With Computers,* 2, (1993), 83-93.

(Continued)

*Primary Examiner*—Phu Nguyen
(74) *Attorney, Agent, or Firm*—Madelynne Farber

(57) ABSTRACT

Computer software for and a method of generating a conformal all quadrilateral or hexahedral mesh comprising selecting an object with unmeshed boundaries and performing the following while unmeshed voids are larger than twice a desired element size and unrecognizable as either a midpoint subdividable or pave-and-sweepable polyhedra: selecting a front to advance; based on sizes of fronts and angles with adjacent fronts, determining which adjacent fronts should be advanced with the selected front; advancing the fronts; detecting proximities with other nearby fronts; resolving any found proximities; forming quadrilaterals or unconstrained columns of hexahedra where two layers cross; and establishing hexahedral elements where three layers cross.

22 Claims, 24 Drawing Sheets

OTHER PUBLICATIONS

Blacker, T. D., "The Cooper Tool", *Proc. 5th International Meshing Roundtable*, (1996), 13-29.

Canann, S. J., "Plastering and Optismoothing: New Approaches to Automated 3D Hexahedral Mesh Generation and Mesh Smoothing", *Ph.D. Dissertation, Brigham Young University, Provo, Utah, USA*, (1991).

Canann, S. A., "Plastering: A New Approach to Automated 3-D Hexahedral Mesh Generation", *American Institute of Aeronautics and Astronics*, (1992).

Cifuentes, A. O., et al., "A Performance Study of Tetrahedral and Hexahedral Elements in 3-D Finite Element Structural Analysis", *Finite Elements in Analysis and Design*, vol. 12, (1992), 313-318.

Dewhirst, D., et al., "The Combination of Hexahedral and Tetrahedral Meshing Algorithms", *Proc. 4th International Meshing Roundtable*, (1995), 291-304.

Dhondt, G. D., "Unstructured 20-Node Brick Element Meshing", *Proc. 8th International Meshing Roundtable*, (1999), 369-376.

Folwell, N. T., et al., "Reliable Whisker Weaving via Curve Contraction", *Proc. 7th International Meshing Roundtable*, (1998),365-378.

Hipp, J., et al., "Plastering: All-Hexahedral Mesh Generation Through Connectivity Resolution", *Proc. 3rd International meshing Roundtable*, (1994).

Knupp, P., et al., "Integration of mesh optimization with 3D all-hex mesh generation", *Tech. Rep. SAND99-2852, Sandia National Laboratories*, (1999).

Kraft, P., "Automatic Remeshing with Hexahedral Elements: Problems, Solutions and Applications", *Proc. 8th International Meshing Roundtable*, (1999), 357-368.

Leland, R. W., et al., "The Geode Algorithm: Combining Hex/Tet Plastering, Dicing and Transition Elements for Automatic, All-Hex Mesh Generation", *Proc 7th International Meshing Roundtable*, (1998), 515-521.

Li, T. S., et al., "Hexahedral Meshing Using Midpoint Subdivision and Integer Programming", *Computer Methods in Applied Mechanics and Engineering*, vol. 124, Issue 1-2, (1995), 171-193.

Meyers, R., et al., "The Â?Hex-TeÂ? Hex-Dominant Meshing Algorithm as Implemented in CUBIT", *Proc. 7th International Meshing Roundtable*, (1998), 151-158.

Mingwu, Lia, "Automatic Hexahedral Mesh Generation by Generalized Multiple Source to Multiple Target Sweeping", *Ph.D. Dissertation, Brigham Young University, Provo, Utah, USA*, (1998).

Mitchell, S. A., et al., "Pillowing Doublets: Refining a Mesh to Ensure That Faces Share at Most One Edge", *Proc. 4th Int. Meshing Roundtable*, (1995), 231-240.

Murdoch, P., et al., "The Spatial Twist Continuum", *Proc. 4th International Meshing Roundtable*, (1995), 243-251.

Owen, S. J., "Non-Simplical Unstructured Mesh Generation", *Ph.D. Dissertation, Carnegie Mellon University, Pittsburgh, Pennsylvania, USA*, (1999).

Owen, S. J., et al., "Q-Morph: An Indirect Approach to Advancing Front Quad Meshing", *International Journal for Numerical Methods in Engineering, 44*, (1999), 1317-1340.

Price, M. A., et al., "Hexahedral Mesh Generation by Medial Surface Subdivision: Part II. Solids with Flat and Concave Edges", *International Journal for Numerical Methods in Engineering*, 40, (1997), 111-136.

Schneiders, R., "A Grid Based Algorithm for the Generation of Hexahedral Element Meshes", *Engineering with Computers*, 12, (1996), 168-177.

Schneiders, R., et al., "Octree-Based Generation of Hexahedral Element Meshes", *Proc. 5th International Meshing Roundtable*, (1996), 205-217.

Staten, M. L., et al., "BMSweep: Locating Interior Nodes During Sweeping", *Proc. 7th International Meshing Roundtable*, (1998), 7-18.

Staten, M. L., et al.,"Unconstrained Paving & Plastering: A New Idea for All Hexahedral Mesh Generation", *Proc. 14th Int. Meshing Roundtable*, (Sep. 8, 2005), 399-416.

Tauteges, T. J., et al., "The Whisker-Weaving Algorithm: A Connectivity Based Method for Constructing All-Hexahedral Finite Element Meshes", *International Journal for Numerical Methods in Engineering*, 39, (1996), 3327-3349.

Tristano, J. R., et al., "Advancing Front Surface Mesh Generation in Parametric Space Using a Riemannian Surface Definition", *Proc. 7th Int. Meshing Roundtable*,(1998), 429-445.

White, D. R., et al., "Automated Hexahedral Mesh Generation by Virtual Decomposition", *Proc. 4th International Meshing Roundtable*, (1995), 165-176.

White, D. R., "Automatic, Quadrilateral and Hexahedral Meshing of Pseudo-Cartesian Geometries using Virtual Subdivision", *MasterÂ?s Thesis, Brigham Young University, Provo, Utah, USA*, (1996).

White, D. R., et al., "Redesign of the Paving Algorithm: Robustness Enhancements through Element by Element Meshing", *Proc. 6th Int. Meshing Roundtable*, (1997), 323-335.

\* cited by examiner

UNCONSTRAINED PAVING AND PLASTERING METHOD FOR GENERATING FINITE ELEMENT MESHES

CROSS-REFERENCE TO RELATED APPLICATIONS

This application claims priority to and the benefit of the filing of U.S. Provisional Patent Application Ser. No. 60/714,502, entitled "Unconstrained Plastering—A New Method for Generating All-Hexahedral Finite Element Meshes", filed on Sep. 6, 2005, and the specification and claims thereof are incorporated herein by reference.

STATEMENT REGARDING FEDERALLY SPONSORED RESEARCH OR DEVELOPMENT

The Government has rights to this invention pursuant to Contract No. DE-AC04-94AL85000 awarded by the U.S. Department of Energy.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to methods and software for generating quadrilateral or hexahedral finite element meshes, particularly all-quadrilateral or all-hexahedral finite element meshes.

2. Description of Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

The search for a reliable all-quadrilateral and all-hexahedral meshing algorithm continues. Many researchers have abandoned the search, relying upon the widely available and highly robust tetrahedral meshing algorithms, such as P.-L. George, H. Borouchaki, *Delaunay Triangulation and Meshing: Application to Finite Elements*, Editions HERMES, Paris (1998). However, quad or hex meshes are still preferable for many applications, and depending on the solver, still required.

For all-quadrilateral meshing, Paving and its many permutations have proven reliable. T. D. Blacker, M. B. Stephenson. "Paving: A New Approach to Automated Quadrilateral Mesh Generation", *International Journal for Numerical Methods in Engineering*, 32, 811-847 (1991); S. J. Owen, M. L. Staten, S. A. Canann, S. Siagal, "Q-Morph: An Indirect Approach to Advancing Front Quad Meshing", *International Journal for Numerical Methods in Engineering*, 44, 1317-1340 (1999); and D. R. White, P. Kinney, "Redesign of the Paving Algorithm: Robustness Enhancements through Element by Element Meshing", *Proc. 6th Int. Meshing Roundtable*, 323-335 (1997). Paving starts with pre-meshed boundary edges which are classified into fronts and advanced inward. As fronts collide, they are seamed, smoothed, and transitioned until only a small unmeshed void remains (usually 6-sided or smaller). Then a template is inserted into this void resulting in quadrilaterals covering the entire surface.

Paving's characteristic of maintaining high quality, boundary-aligned rows of elements is what has made it a successful approach to quad meshing. In addition, because of its ability to transition in element size, Paving is able to match nearly any boundary edge mesh.

There have been many attempts to extend Paving to arbitrary three-dimensional (3D) solid geometry. While valuable contributions to the literature, these attempts have not resulted in reliable general algorithms for hexahedral meshing. Plastering was one of the first attempts. S. A. Canann, *Plastering: A New Approach to Automated 3-D Hexahedral Mesh Generation*, American Institute of Aeronautics and Astronics (1992); J. Hipp, R. Lober, "Plastering: All-Hexahedral Mesh Generation Through Connectivity Resolution", *Proc. 3rd International meshing Roundtable* (1994); S. A. Canann, "Plastering and Optismoothing: New Approaches to Automated 3D Hexahedral Mesh Generation and Mesh Smoothing", Ph.D. Dissertation, Brigham Young University, Provo, Utah, USA (1991); and T. D. Blacker, R. J. Meyers, "Seams and Wedges in Plastering: A 3D Hexahedral Mesh Generation Algorithm", *Engineering With Computers*, 2, 83-93 (1993). In Plastering, the bounding surfaces of the solid are quad meshed, fronts are determined and then advanced inward. However, once opposing fronts collide, the algorithm frequently has deficiencies. Unless the number, size, and orientation of the quadrilateral faces on opposing fronts match, Plastering is rarely able to resolve the unmeshed voids.

Many creative attempts have been made to resolve this unmeshed void left behind by plastering. Since arbitrary 3D voids can be robustly filled with tets, the idea of plastering in a few layers, followed by tet-meshing the remaining void was attempted. D. Dewhirst, S. Vangavolu, H. Wattrick, "The Combination of Hexahedral and Tetrahedral Meshing Algorithms", *Proc. 4th International Meshing Roundtable*, 291-304 (1995); and R. Meyers, T. Tautges, P. Tuchinsky, "The 'Hex-Tet' Hex-Dominant Meshing Algorithm as Implemented in CUBIT", *Proc. 7th International Meshing Roundtable*, 151-158 (1998). Transitions between the tets and hexes were done with Pyramids and multi-point constraints. Hexahedra Conformability", Trends in Unstructured Mesh Generation, *AMD* Vol. 220, 123-129, ASME (1997). The Geode-Template provided a method of generating an all-hex mesh by refining both the hexes and tets. R. W. Leland, D. Melander, R. Meyers, S. Mitchell, T. Tautges, "The Geode Algorithm: Combining Hex/Tet Plastering, Dicing and Transition Elements for Automatic, All-Hex Mesh Generation", *Proc 7th International Meshing Roundtable*, 515-521 (1998). However, this required an additional refinement of the entire mesh resulting in meshes much larger than required. In addition, the Geode-Template was unable to provide reasonable element quality.

A draw-back of Paving is the need for expensive intersection calculations. An alternative to Paving called Q-Morph, White, supra, eliminated the need for intersection calculations by first triangle meshing the surface. This triangle mesh is then "transformed" into a quad mesh. Using a similar advancing front technique to paving, triangles are locally reconnected, repositioned, and combined to form quads. Q-Morph is able to form high-quality quadrilateral elements with similar characteristics to paving. Q-Morph has proven to be a robust and reliable quad meshing algorithm in common use in several commercial meshing packages.

An attempt at extending Q-Morph to a hex-dominant meshing algorithm was done with H-Morph. S. J. Owen, "Non-Simplical Unstructured Mesh Generation", Ph.D. Dissertation, Carnegie Mellon University, Pittsburgh, Pa., USA (1999). This algorithm takes an existing tetrahedral mesh and applies local connectivity transformations to the elements. Groups of tetrahedral are then combined to form high-quality hexahedra. The advancing front approach was also used for ordering and prioritizing tetrahedral transformations. Although H-Morph had the desirable characteristics of regular layers near the boundaries, it was unable to reliably resolve the interior regions to form a completely all-hex mesh since it also attempted to honor a pre-meshed quad boundary.

Recognizing the difficulty of defining the full connectivity of a hex mesh using traditional geometry-based advancing front approaches, the Whisker-Weaving algorithm attempted to address the problem from a purely topological approach. T. J. Tautges, T. Blacker, S. Mitchell, "The Whisker-Weaving Algorithm: A Connectivity Based Method for Constructing All-Hexahedral Finite Element Meshes", *International Journal for Numerical Methods in Engineering*, 39, 3327-3349 (1996); P. Murdoch, S. Benzley, "The Spatial Twist Continuum", *Proc. 4th International Meshing Roundtable*, 243-251 (1995); and N. T. Folwell, S. A. Mitchell, "Reliable Whisker Weaving via Curve Contraction," *Proc. 7th International Meshing Roundtable*, 365-378 (1998). It attempts to first generate the complete dual of the mesh, from which the primal, or hex elements, are readily obtainable. Although whisker-weaving can in most cases generate a successful dual topology, resulting hex elements are often poorly shaped or inverted.

Plastering, H-Morph, Whisker Weaving and all of their permutations are classified as Outside-In-Methods. They start with a pre-defined boundary quad mesh and then attempt to use that to define the hex connectivity on the inside. Another class of Hex meshing algorithms can be classified as Inside-Out methods. R. Schneiders, R. Schindler, R. Weiler, "Octree-Based Generation of Hexahedral Element Meshes", *Proc. 5th International Meshing Roundtable*, 205-217 (1996); P. Kraft, "Automatic Remeshing with Hexahedral Elements: Problems, Solutions and Applications", *Proc. 8th International Meshing Roundtable*, 357-368 (1999); and G. D. Dhondt, "Unstructured 20-Node Brick Element Meshing", *Proc. 8th International Meshing Roundtable*, 369-376 (1999). These algorithms fill the inside of the solid with elements first, often using an octree-based grid. This grid is then adapted to fit the boundary. These methods place high quality elements on the interior of the volume, however, they typically generate extremely poor quality elements on the boundary. In addition, traditional Inside-Out methods are unable to mesh assemblies with conformal meshes. These inside-out methods seem particularly popular with the metal forming industry, but of less appeal in structural mechanics applications.

Sweeping based methods are among the most widely used hexahedral based meshing algorithms in industry today. T. D. Blacker, "The Cooper Tool", *Proc. 5th International Meshing Roundtable*, 13-29 (1996); Mingwu Lai, "Automatic Hexahedral Mesh Generation by Generalized Multiple Source to Multiple Target Sweeping", Ph.D. Dissertation, Brigham Young University, Provo, Utah, USA (1998); and M. L. Staten, S. Canann, S. Owen, "BMSweep: Locating Interior Nodes During Sweeping", *Proc. 7th International Meshing Roundtable*, 7-18 (1998). Sweeping, however, applies only to solids which are 2.5D, or solids which can be decomposed into 2.5D sub-regions. There has been a considerable amount of research in sweeping and many successful implementations have been published. It is typically quite simple to decompose and sweep simple to medium complexity solids. However, as more complexity is added to the solid model, the task of decomposing the solids into 2.5D sub-regions can be daunting, and in some regards, an art-form requiring significant creativity and experience.

Advancing front methods have proven ideal for triangle, quadrilateral and even tetrahedral meshes. They have been successful in these arenas because of the smaller number of constraints imposed by the connectivity of these simple element shapes. Hexahedral meshes, on the other hand, must maintain a connectivity of eight nodes, 12 edges, and six faces per element, with strict constraints on warping and skewness. As a result, unlike tetrahedral meshes, minor local changes to the connectivity of a hex mesh can have severe consequences to the global mesh structure. For this reason, current hexahedral advancing front methods where the boundary is prescribed apriori have rarely succeeded for general geo-metric configurations.

Current advancing front methods, while having the high ideal of maintaining the integrity of a prescribed boundary mesh, frequently fail because the very boundary mesh they are attempting to maintain over-constrains the problem, creating a predicament which can be intractable.

To resolve this issue, the present invention introduces a new concept, known as Unconstrained Plastering, as presented in M. L. Staten, S. J. Owen, T. D. Blacker, "Unconstrained Paving & Plastering: A New Idea for All Hexahedral Mesh Generation," *Proc. 14th Int. Meshing Roundtable*, 399-416 (Sep. 8, 2005). With this approach, one relaxes the constraint of prescribing a boundary apriori quad mesh. While still maintaining the desirable characteristics of advancing front meshes, Unconstrained Plastering is free to define the topology of its boundary mesh as a consequence of the interior meshing process. It is understood that not prescribing an apriori boundary quad mesh can have implications on the traditional bottom-up approach to mesh generation. These implications, however, are significantly outweighed by the prospect of automating the all-quad or all-hex mesh generation process through a more top-down approach to the problem that Unconstrained Plastering offers.

BRIEF SUMMARY OF THE INVENTION

The present invention is of computer software for and a method of generating a conformal all quadrilateral or hexahedral mesh, comprising: selecting an object with unmeshed boundaries; and performing the following steps while unmeshed voids are larger than twice a desired element size and unrecognizable as either a midpoint subdividable or pave-and-sweepable polyhedra: selecting a front to advance; based on sizes of fronts and angles with adjacent fronts, determining which adjacent fronts should be advanced with the selected front; advancing the fronts; forming quadrilaterals or unconstrained columns of hexahedra where two layers cross; and establishing hexahedral elements where three layers cross. In the preferred embodiment the invention additionally performs layer smoothing and seaming and merging, inserting tucks and/or wedges, and identifying unmeshed voids, connecting tubes, and connecting webs, most preferably including defining constraints between unmeshed voids through connecting tubes, meshing interior voids with a midpoint subdivision, pave-and-sweep, or T-Hex procedure, sweeping the connecting tubes between voids and out to the boundaries, and splitting connecting webs. The advancing front can be incomplete. The invention preferably merges and seams colliding fronts, including merging and employing triangle patterns to resolve colliding fronts.

The present invention is also of computer software for and a method of generating a conformal all quadrilateral or hexahedral mesh, comprising selecting an object having an unmeshed boundary and employing advancing fronts from the unmeshed boundary to form the mesh.

The present invention is further of computer software for and a method of generating a conformal all-quadrilateral mesh, comprising selecting an object having an unmeshed boundary and forming the mesh by advancing partially defined rows of quadrilaterals rather than discrete, fully-defined quadrilaterals.

The present invention is additionally of computer software for and a method of generating a conformal all-hexahedral mesh, comprising selecting an object having an unmeshed boundary and forming the mesh by advancing partially defined sheets of hexahedra rather than discrete, fully-defined hexahedra.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention, referred to herein as "Unconstrained Plastering", provides a method and software for generating a conformal all-quadrilateral or all-hexahedral mesh on any solid geometry assembly. Paving has proven reliable for quadrilateral meshing on arbitrary surfaces. However, the 3D corollary, Plastering, is unable to resolve the unmeshed center voids due to being over-constrained by a pre-existing boundary mesh. Unconstrained Plastering leverages the benefits of Paving and Plastering, without the over-constrained nature of Plastering. Unconstrained Plastering uses advancing fronts to inwardly project unconstrained hexahedral layers from an unmeshed boundary. Only when three layers cross, is a hex element formed. Resolving the final voids is easier since closely spaced, randomly oriented quadrilaterals do not over-constrain the problem.

Figure 1:
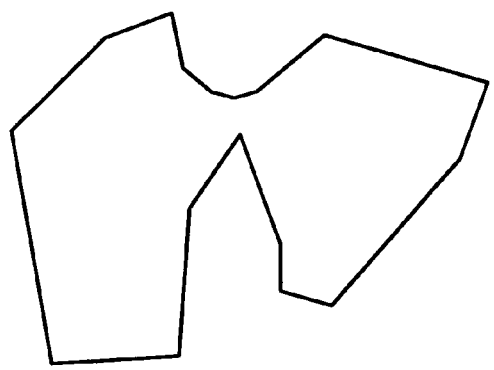
FIG. 1 is a two-dimensional example surface to be meshed.
Figure 2:
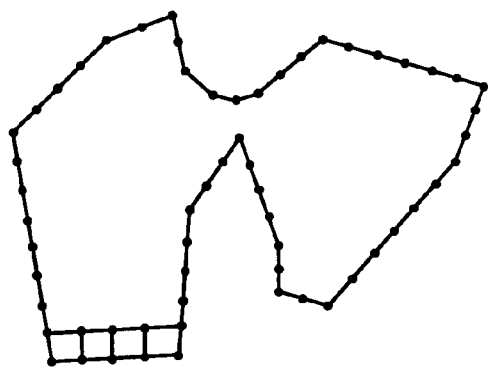
FIG. 2 is the example surface with meshed boundary and one row paved.

To best understand the general concept behind Unconstrained Plastering, first examine the 2D corollary, Unconstrained Paving. FIG. 1 shows a geometric surface ready for quad meshing. If one were to pave this surface, one would first mesh each of the surfaces boundary curves, after which one would advance a row of quads along one of the boundary curves as can be seen in FIG. 2. In this case four quads were added because the curve along which the row was paved was pre-meshed with four mesh edges.

Figure 3:
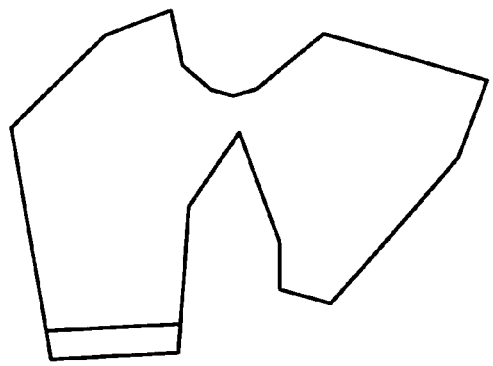
FIG. 3 is the example surface with one row advanced with Unconstrained Paving.
Figure 4:
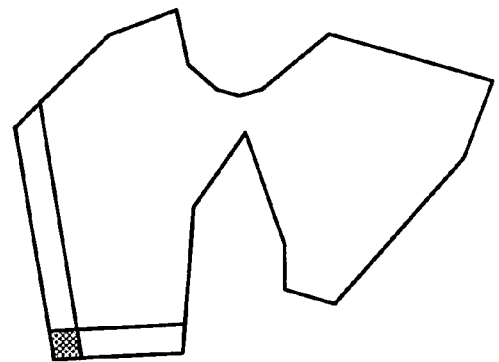
FIG. 4 shows two rows advanced with Unconstrained Paving.

If, instead, the surface was being meshed with Unconstrained Paving, the boundary curves would not be pre-meshed with edges. Advancing, or paving, an unconstrained row would result in FIG. 3. In this case a row of quads have been inserted, however, we do not know how many quads will be in that row. The number of quads in this row is determined as adjacent rows cross it. FIG. 4 shows what the mesh looks like after a second row is advanced. Since the second row advanced crossed the first row advanced, a single quad is formed (shaded) in the corner where the two rows cross. However, both of the rows still have an undetermined number of quads in them.

Figure 5:
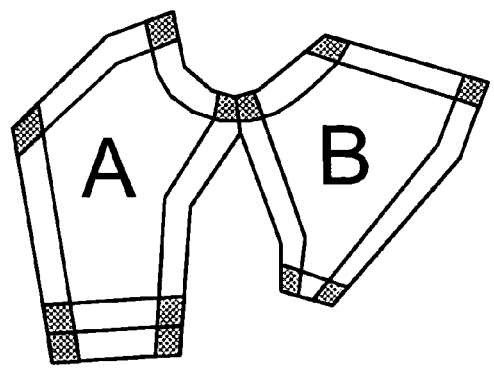
FIG. 5 shows additional rows advanced with Unconstrained Paving.

In FIG. 5, several additional rows have been advanced and 12 quadrilateral elements have been formed where the various unconstrained rows have crossed. At this point, the unmeshed portion of the surface has been subdivided into two sub-regions (sub-region A and B). It is important to note that both of these unmeshed regions are completely unconstrained. For example, sub-region A is bound by five edges, however, none of these edges has been meshed. Sub-region A is free to be meshed with as many divisions as needed along all of these edges.

Figure 6:
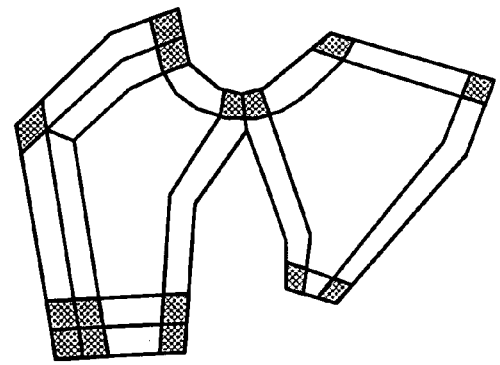
FIG. 6 shows a transition row inserted based on a large angle between two adjacent rows.

Like traditional Paving, Unconstrained Paving has the ability to insert irregular nodes (nodes with more or less than four adjacent quads) in order to transition and fit the shape of the surface. In traditional Paving, this is done by assigning states to the fronts based on angles with adjacent fronts. Unconstrained Plastering is no different. The start and end of an advanced unconstrained row likewise depends upon states and angles. FIG. 6 shows the advancement of an additional row, which, because of angles is the advancement of two previously advanced rows.

Figure 7:
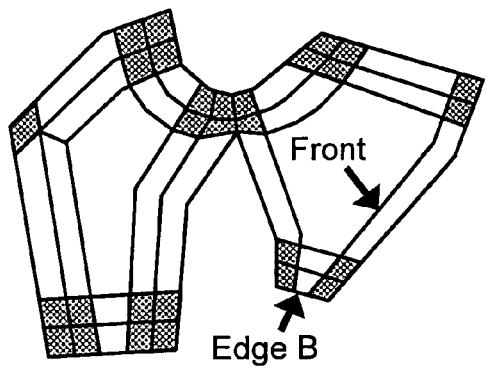
FIG. 7 shows that Front A cannot be advanced normally because Edge B is too short.
Figure 8:
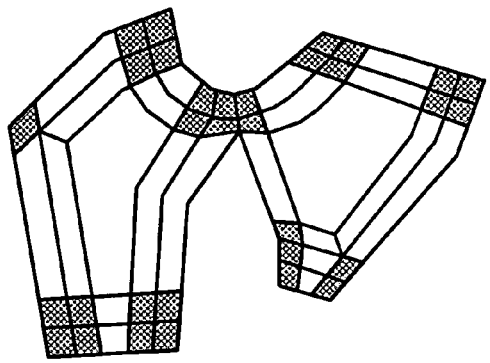
FIG. 8 shows a transition row inserted based on front sizes.

FIG. 7 shows an additional case where rows must be advanced with care. Front A is the next front to advance, however, Edge B is too short even though angles indicate that the advancement of Front A should extend to Edge B. In this case, Front A can be advanced as shows in FIG. 8.

Figure 9:
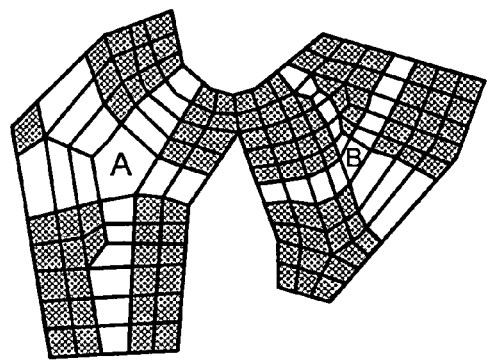
FIG. 9 shows unconstrained rows advanced leaving only small unmeshed voids and connecting tubes; Quads are shaded and connecting tubes are white.

Unconstrained rows continue to advance as previously described. Rows bend through the mesh as required to maintain proper quadrilateral connectivity ensuring that all quadrilateral elements created are of proper size. In addition, Paver-like row smoothing and seaming, along with the insertion of tucks and wedges are additional operations that can be performed on the unconstrained rows. FIG. 9 illustrates the example surface and how it may look after several more rows are advanced. All edges on the unmeshed sub-regions A and B are less than two times the desired element size, and so one stops advancing fronts. At this point, it is time to resolve the unmeshed voids.

In general, the unmeshed sub-regions will be any general polygon, with any number of sides. It is assumed that each polygon will be convex. If it is not convex, that would suggest that an additional row needs to be advanced before resolving the unmeshed void. It is also assumed that the size of the polygon is roughly one-to-two times the desired element size. If it is larger than this, then additional unconstrained rows should be advanced until the remaining polygon is one-to-two times the desired element size.

Also, note that the unmeshed region is completely unconstrained. Each of the edges on the unmeshed polygons are connected to the boundary of the mesh through "connecting tubes". Connecting tubes are the white regions in FIG. 9 that have been crossed by only a single row. The edges of each polygon can be meshed with any number of edges, which will be propagated back to the boundary through the connecting tubes.

At this point, the polygon is meshed with a template quad mesh similar to the templates used to fill the voids during Paving. The template inserted is based on the relative lengths of edges, and angles between edges. In the general case, any convex polygon can be meshed with midpoint subdivision. T. S. Li, R. M. McKeag, C. G. Armstrong, "Hexahedral Meshing Using Midpoint Subdivision and Integer Programming", *Computer Methods in Applied Mechanics and Engineering*, Vol. 124, Issue 1-2, 171-193 (1995). Midpoint subdivision meshes convex polygons by adding a node at the centroid of the polygon and connecting it to nodes added at the center of each polygon boundary edge. The number of new quads formed is equal to the number of points defining the polygon. Although midpoint subdivision can always be used to mesh the void, simpler templates are often possible.

Figure 10:
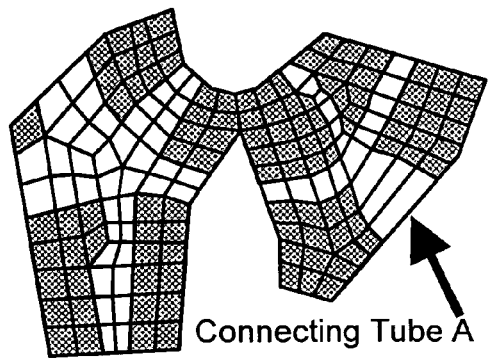
FIG. 10 shows that unmeshed voids have been meshed.

In FIG. 9, since sub-region B is already four-sided and is of proper size and shape, it can be converted into a single quadrilateral element. However, sub-region A is meshed with midpoint subdivision since it has five sides. The resulting mesh is illustrated in FIG. 10.

Figure 11:
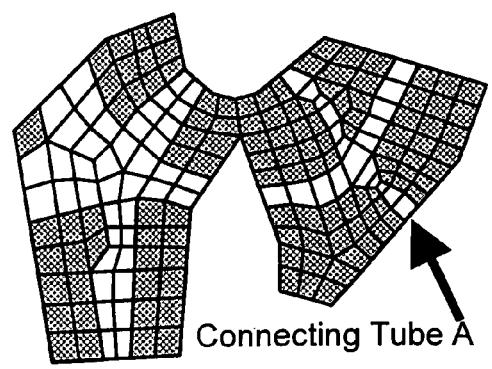
FIG. 11 shows that sizes in connecting tubes have been resolved.
Figure 12:
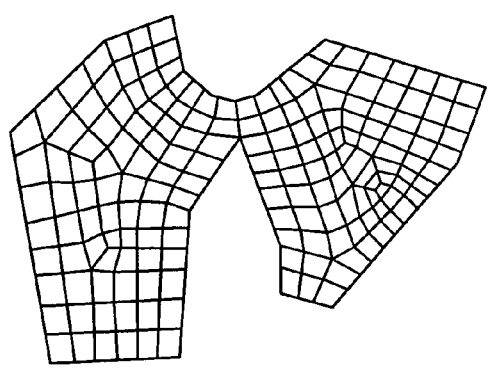
FIG. 12 shows the final quad mesh after cleaning and smoothing.

Before Unconstrained Paving is finished, the connecting tubes must be examined for size. In FIG. 10 Connecting Tube A is much too wide. This can be fixed by advancing a few more rows until the proper size is obtained as shown in FIG. 11. Traditional quadrilateral cleanup operations and smoothing can then be performed to finalize the mesh connectivity and quality as shown in FIG. 12.

In real world models, rarely is the geometry confined to a single surface. For example, sheet metal parts in the auto industry representing automobile hoods often contain thousands of surfaces. Each of these surfaces must share nodes and element edges with its neighboring surfaces across its boundary edges in order to ensure a conformal mesh.

Figure 13:
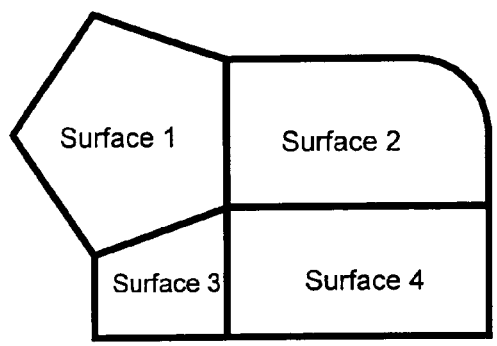
FIG. 13 is an example set of surfaces with multiple adjacent surfaces requiring a conformal mesh.
Figure 14:
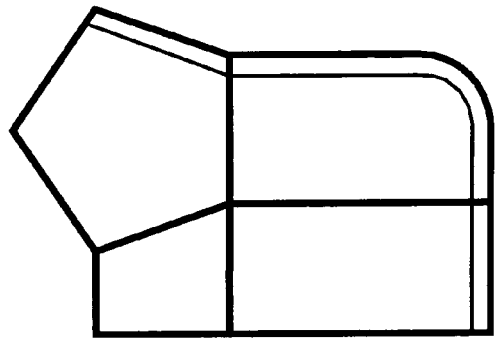
FIG. 14 shows an unconstrained row advanced and extending through multiple surfaces.
Figure 15:
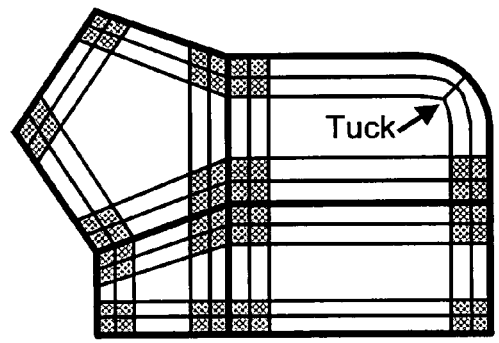
FIG. 15 shows additional rows advanced including a tuck.

Typically, algorithms that do not pre-mesh the curves of surface before meshing have difficulty ensuring a conformal mesh. However, Unconstrained Paving can be extended to ensure conformal meshes between any number of surfaces. The penalty, however, is that all of the surfaces must be meshed at the same time. For example, FIG. 13 illustrates four adjacent surfaces which require a conformal mesh. FIG. 14 shows the same model with one unconstrained row advanced. The row was advanced in three of the surfaces. FIG. 15 shows several additional rows inserted and the formation of a tuck in surface 2. Notice that curves which are shared by more than one surface are double-sided fronts advancing into both adjacent surfaces.

Figure 16:
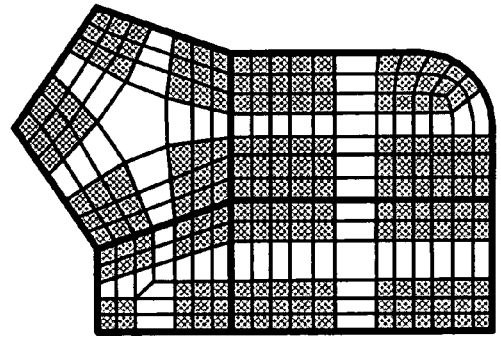
FIG. 16 shows that only small voids and connecting tubes remain.
Figure 17:
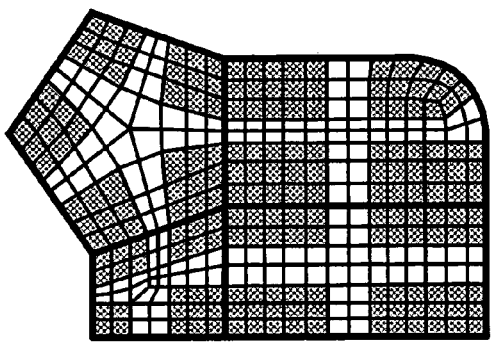
FIG. 17 shows all unmeshed voids and connecting tubes as meshed.

After additional rows are advanced, FIG. 16 shows the small unmeshed voids and the connecting tubes. It is important to note that when meshing multiple surfaces at once, the connecting tubes impose additional constraints on how the unmeshed voids can be meshed. However, these constraints can always be satisfied with midpoint subdivision since this would split each edge in every connecting tube exactly once. FIG. 17 shows what the mesh may look like before a final pass through cleanup and smoothing.

The basic principles of Unconstrained Paving extend to 3D as Unconstrained Plastering. The preferred basic algorithm is as follows and is described in the following sections.

1. Start with a solid assembly with unmeshed volume boundaries.
2. Define fronts, which initially are the surfaces of the volumes.
3. While the unmeshed voids of the solids are larger than twice the desired element size:
   a. Select a front to advance;
   b. Based on sizes of fronts, and angles with adjacent fronts, determine which adjacent fronts should be advanced with the current front;
   c. Advance the fronts;
   d. Form unconstrained columns of hexahedra where 2 layers cross;
   e. Form actual hexahedral elements where 3 layers cross;
   f. Perform layer smoothing and seaming; and
   g. Insert tucks and wedges as needed.
4. Identify unmeshed voids, connecting tubes, and connecting webs.
5. Define constraints between unmeshed voids through connecting tubes.
6. Mesh the interior voids with either midpoint subdivision or T-Hex.
7. Sweep the connecting tubes between voids and out to the boundary.
8. Split connecting webs as needed.
9. Smooth all nodes to improve element quality.

Figure 18:
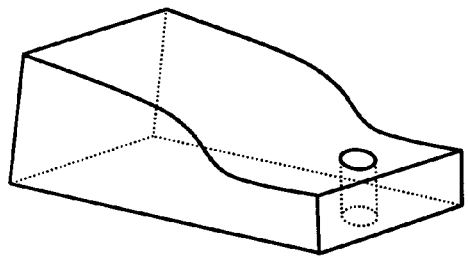
FIG. 18 shows an unconstrained plastering example model.
Figure 19:
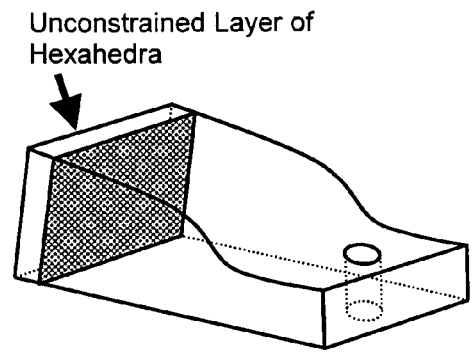
FIG. 19 shows one unconstrained hex layer having been advanced.

The model in FIG. 18 will be used an example of Unconstrained Plastering. FIG. 19 shows a single unconstrained hexahedral layer advanced. The new surface displayed in FIG. 19 represents the top of the layer of hexes which will be adjacent to the advanced surface. The region between the boundary and the new surface represents an unconstrained layer of hexahedra. It is still unknown how many hexes will be in this layer, however, we do know that it will contain a single layer of hex elements.

Figure 20:
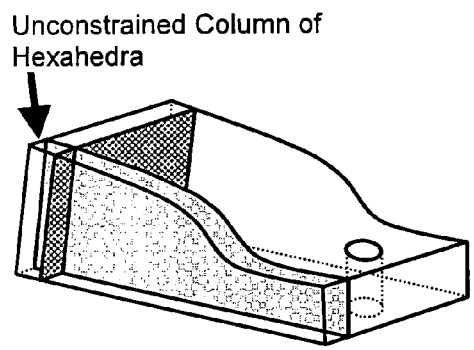
FIG. 20 shows that when two layers cross, an unconstrained column of hexes is defined.

In FIG. 20, a second layer is advanced, which crosses the first layer advanced previously. When two layers cross, a column of hexahedra is formed, however, the size and number of hexahedra in this column will not be determined until additional hex layers cross this column.

Figure 21:
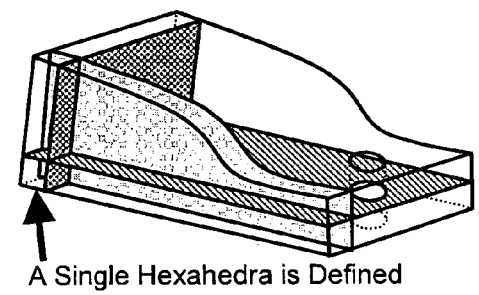
FIG. 21 shows that when three layers cross, a hexahedral element is defined.

In FIG. 21, a third layer is advanced, which crosses both of the previously defined layers. Wherever three layers cross, a hexahedral element is formed. In FIG. 21, a single hex element is defined in the lower left corner. Note that until now, no final decisions have been imposed on placement of hexahedra. It is only when three orthogonal layers intersect that hex placement becomes finalized.

Figure 22:
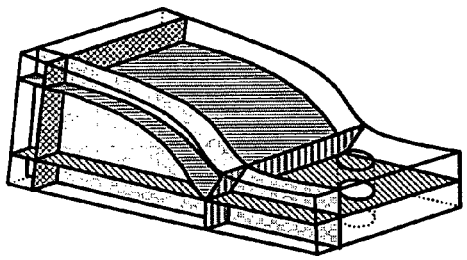
FIG. 22 shows additional layers advanced.
Figure 23:
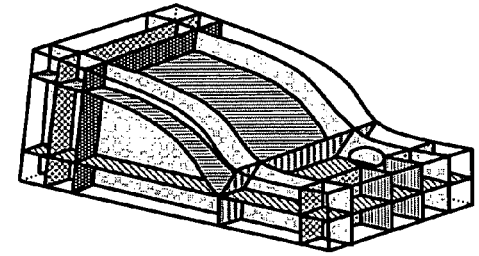
FIG. 23 shows further additional layers advanced.
Figure 24:
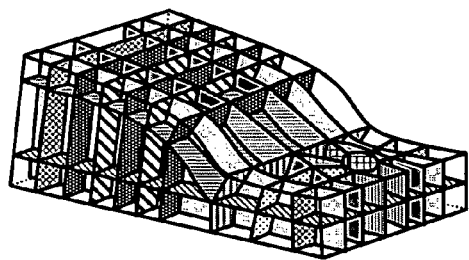
FIG. 24 shows that additional layers are advanced until the unmeshed void is small.

The process continues in FIG. 22, FIG. 23, and FIG. 24. Each time two layers cross a column of hexahedra is defined. Each time a third layer cross a column, a single hexahedral element is defined. During this process, there will be transition layers inserted with logic similar to that described in above. Layers are advanced until the unmeshed void is approximately twice the desired element size.

A front to advance is a group of one or more adjacent surfaces which are advanced together. The order that fronts are processed in Unconstrained Plastering is very important. Factors to consider when choosing the next front to advance include:

1. Number of layers away from the boundary the front is. Fronts closer to the boundary should be processed first.

Figure 25:
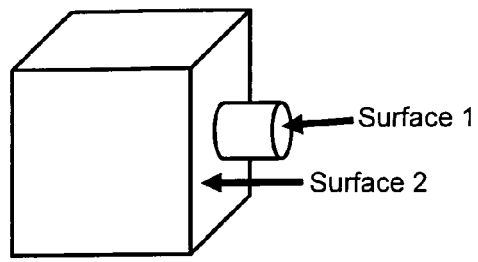
FIG. 25 shows surface 1 as a "complete" front, while Surface 2 is "incomplete"

2. If the front is "complete" or not. A complete front is a group of surfaces which are completely surrounded by what are referred to as "ends" in Paving and Sub-mapping. D. R. White, L. Mingwu, S. Benzley, "Automated Hexahedral Mesh Generation by Virtual Decomposition", *Proc. 4th International Meshing Roundtable,* 165-176 (1995); and D. R. White, "Automatic, Quadrilateral and Hexahedral Meshing of Pseudo-Cartesian Geometries using Virtual Subdivision", Master's Thesis, Brigham Young University, Provo, Utah, USA (1996). For example, in FIG. 25, Surface 1 is complete since its boundary is adjacent to a cylindrical face which is perpendicular to Surface 1. In contrast, Surface 2 is incomplete since it is bounded on one of its loops by an "end", but is bound on its other loop with a "corner". The best way to proceed would be advance Surface 1 several times until it becomes even with Surface 2, at which the front from Surface 1 and Surface 2 would be combined and advanced as a single front.

3. The size of the front. Smaller fronts should probably be processed first.

4. How much distance there is ahead of the front before a collision will occur. Fronts with a lot of room to advance should probably be processed first.

Figure 26:
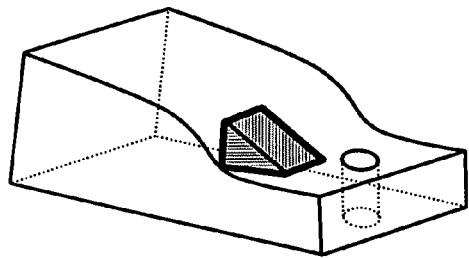
FIG. 26 shows an unmeshed void.

Like Unconstrained Paving, there will be unmeshed voids at the center of each volume being meshed. The unmeshed voids can be easily identified because they are the regions in space that have not been crossed by any hex layers. FIG. 26 illustrates the unmeshed void at the center of the example model. In general, these voids define general polyhedra. It is assumed that these polyhedra are convex. If they are not convex, that suggests that an additional layer should be advanced before resolving the voids. Although there is no known theoretical basis to prove that advancing additional rows will always ensure a convex polyhedra, experience has shown that it does. Likewise, it is assumed that all edges and faces of the polyhedra are approximately twice the desired element size, or less. If they are larger than this, it suggests that an additional layer should be advanced.

Figure 27:
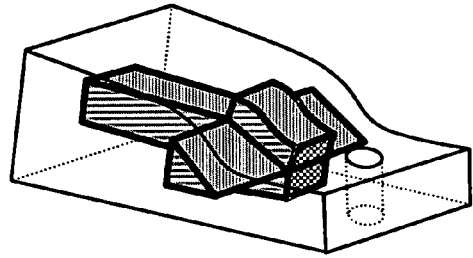
FIG. 27 shows connecting tubes.

In addition to identifying the unmeshed voids, one must also identify the connecting tubes and connecting webs. Connecting tubes are those regions in space which have been crossed by only a single hex layer as illustrated in FIG. 27. In order to define a hex, three layers must cross, which gives the connecting tubes two degrees of freedom, allowing them to be swept as a one-to-one sweep. The direction of the sweep is perpendicular to the single layers which already cross the connecting tube. The number of layers in the sweep is the same as the number of hex layers the connecting tube crosses between the unmeshed poly-hedra and the boundary surface.

Figure 28:
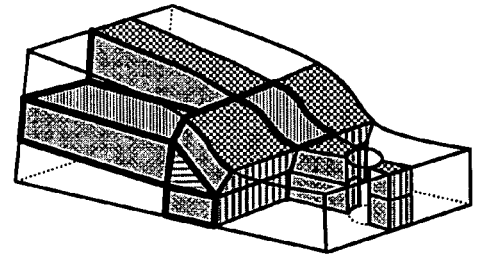
FIG. 28 shows connecting webs.

Connecting webs are those regions in space which have been crossed by only two hex layers as illustrated in FIG. 28. Connecting webs only have a single degree of freedom. Essentially, connecting webs represents a layer of hexahedra which will be split the same number of times that the adjacent connecting tubes are split. In this example model, there is one small connecting web section which is not attached to any connecting tubes or unmeshed void. This will happen in locations where seaming has been performed, since seaming will often eliminate or split the unmeshed void. In the example model, the front that was advanced from the front-right surface was seamed with the fronts extending from the hole.

Figure 29:
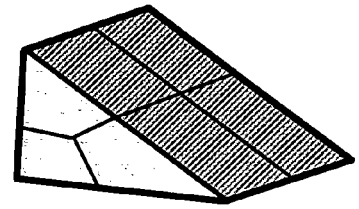
FIG. 29 shows a midpoint subdivision of the unmeshed void.

After the unmeshed voids, connecting tubes, and connecting webs have been identified, the unmeshed void is meshed preferably using either midpoint subdivision or T-Hex. Midpoint sub-division is the preferable method since it generates higher quality elements. To determine if midpoint subdivision is possible, a simple count of the number of curves connected to each vertex on the unmeshed polyhedra is done. If there are any vertices which have four or more connected curves, then midpoint subdivision is not possible. The unmeshed void in FIG. 26 can be meshed with midpoint subdivision as illustrated in FIG. 29.

Figure 30:
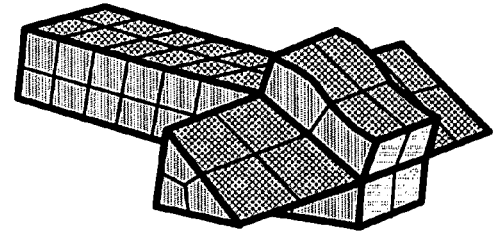
FIG. 30 shows the connecting tubes as swept.
Figure 31:
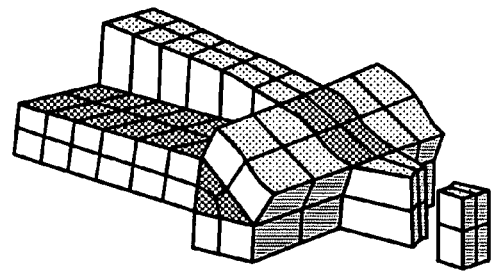
FIG. 31 shows the connecting webs as split.
Figure 32:
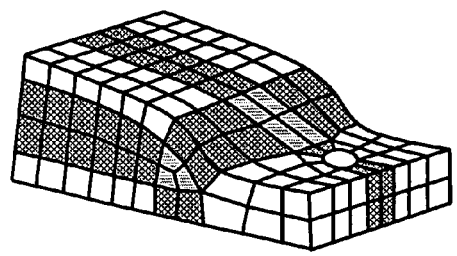
FIG. 32 shows the final mesh using midpoint subdivision of voids; connecting tubes and connecting webs are differently shaded.

After the unmeshed void is meshed, the connecting tubes are swept as shown in FIG. 30 using the mesh from the unmeshed void as the source. Finally, the connecting webs can be split as illustrated in FIG. 31. The final mesh on the example model, after some global smoothing, is shown in FIG. 32. The connecting tubes exposed to the boundary of the mesh and the exposed connecting webs are differently shaded.

Figure 33:
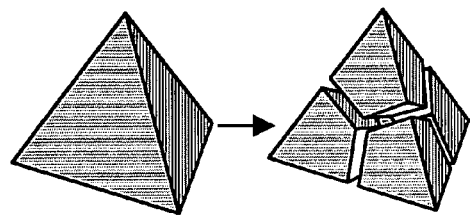
FIG. 33 shows a T-Hex template.
Figure 34:
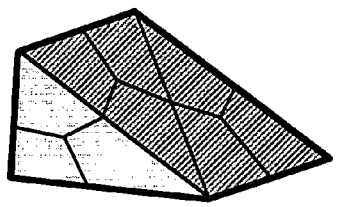
FIG. 34 shows use of T-Hex on the unmeshed void.
Figure 35:
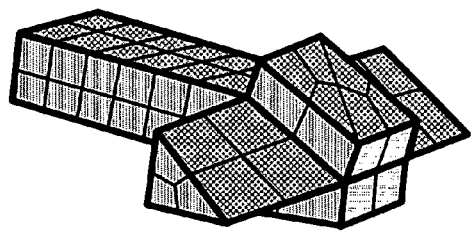
FIG. 35 shows the connecting tubes as swept with a T-Hex mesh.
Figure 36:
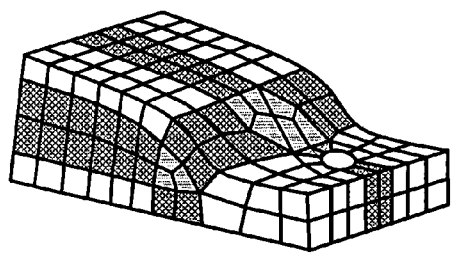
FIG. 36 shows the final mesh using T-Hex on voids; connecting tubes and connecting webs are differently shaded.

If the polyhedra cannot be meshed with midpoint subdivision, it is meshed with the T-Hex template instead. To do this, one first takes each non-triangular polygon on each unmeshed polyhedra and split it into triangles. If the polygon being split is connected to other un-meshed polyhedra through connecting tubes, one must be careful that the face is split the same on both polyhedra so the sweeper can match them up through the connecting tubes. To ensure that they are split the same, a node can be added at the center of the face and triangles are formed using each edge on the polygon and the newly created center node. After each face is split into triangles, the polyhedra are meshed with tets. Since we are assuming that the unmeshed void is 1-2 times the desired element size, one would like to mesh these polyhedra without introducing any nodes interior to the polyhedra. Not putting any new nodes in the polyhedra will also help with element quality since T-Hex meshes are worst when T-Hexing around a node surrounded completely by tet elements. After the polyhedra are tet meshed, each tet is split into four hexahedral elements using the T-Hex template shown in FIG. 33. The T-Hex mesh for the polyhedra in the example problem is shown in FIG. 34 and the mesh on the connecting tubes in FIG. 35. Since, in this example, one is meshing only a single solid, there are no constraints between multiple unmeshed voids. Therefore, the quadrilateral face on the top of the polyhedra is preferably split into only two triangles before tetrahedralization. FIG. 36 shows the final mesh after some global smoothing. The connecting tubes exposed to the boundary of the mesh and the exposed connecting webs are differently shaded.

T-Hex has long been known as a guaranteed way to get an all hexahedral mesh on nearly any solid geometry. However, the quality of the elements that result is rarely sufficient for most solver codes. Critics of Unconstrained Plastering may point to the use of T-Hex on interior voids as a major downfall of Unconstrained Plastering. However, before that judgment can be made, the following should be considered:

1. T-Hex is only used when interior voids have a vertex with a valence of four or more. In most cases, the interior voids can be meshed with midpoint subdivision.

2. The worst quality hexahedra in T-Hex meshes are found adjacent to nodes which were completely surrounded by tets in the initial tet mesh. This is because a tet mesh can have nodes with a valence of 15 or more, which results in the same number of hexahedra when the T-Hex template is applied. This case should not appear during Unconstrained Plastering, since one assumes that enough unconstrained layers have been advanced to make the interior voids small enough to be tet meshed with no interior nodes.

3. The T-Hex looking elements that are swept to the boundary through connecting tubes are not poor in quality since a swept T-Quad mesh is much higher quality than a traditional T-Hex mesh.

4. Any poor quality hexahedra that are formed by Unconstrained Plastering will be in the interior voids which should be on the deep interior of the volumes, with the exception of thin parts which require only one or two layers of hexahedra through the thickness.

Figure 37:
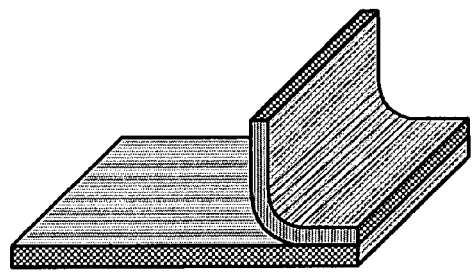
FIG. 37 shows an assembly model.
Figure 38:
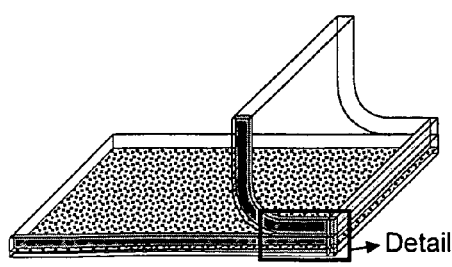
FIG. 38 shows the assembly model with three advanced Unconstrained Plastering layers.
Figure 39:
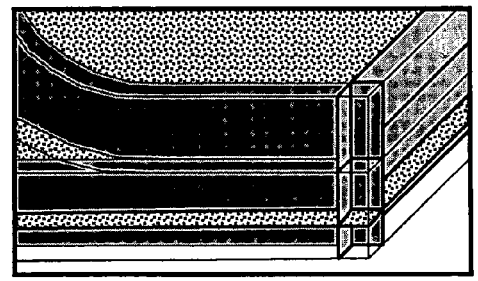
FIG. 39 provides a detail view of FIG. 38.

Even though Unconstrained Plastering does not seem capable of honoring existing boundary quad meshes, it can be used to mesh assemblies of solids and still get a conformal mesh. Like Unconstrained Paving, however, all of the volumes in the assembly must be meshed at once. FIG. 37 illustrates a simple assembly model to be meshed. FIG. 38 and FIG. 39 show the same model after three unconstrained layers have been advanced. FIG. 39 shows that the unconstrained layers have been extended and advanced through both of the solids in the assembly. Like Unconstrained Paving, surfaces which are shared by both volumes will behave as double-sided fronts advancing into both volumes.

Like other advancing front algorithms, Unconstrained Plastering will have the tendency to put the highest quality element near the boundary. One limitation that Unconstrained Plastering will have compared to Unconstrained Paving is the lack of hexahedral cleanup operations. Unlike quadrilateral cleanup, hexahedral cleanup operations are limited due to the highly constrained nature of hexahedra. M Bern, D. Eppstein, "Flipping Cubical Meshes," *Proc. 10th International Meshing Roundtable*, 19-29 (2001); and P. Knupp and S. A. Mitchell, "Integration of mesh optimization with 3D all-hex mesh generation," Tech. Rep. SAND99-2852, Sandia National Laboratories (1999). As a result, Unconstrained Plastering will be required to create hexahedral topology that will permit good element quality rather than relying on a post-processing cleanup step to fix poor elements.

A possible particular implementation of Unconstrained Plastering uses a faceted surface based approach, as follows:
1. Triangle mesh all of the boundary surfaces using an element size approximately equal to the desired hexahedral element size.
2. Traverse through this triangle mesh to eliminate any unnecessary Computer-Aided Design (CAD) artifacts (e.g., small angles, slivers, etc.).
3. Divide the triangles up into groups which form Surfaces or Fronts. They are grouped together considering the original CAD topology, but also dihedral angles between the original CAD surfaces.
4. For each volume in the assembly being meshed, form a "cell". Each cell has three associated layer ids. These initial cells get (UNDEFINED, UNDEFINED, UNDEFINED) as their initial layer ids.
5. While any cell is larger than twice the desired element size:
   a. Choose a set of Surfaces to advance to form a new layer.
   b. Advance the triangle mesh on these surfaces into the volume. A faceted surface is created offset by the desired element size to the advancing surfaces.
   c. Form a new cell between each newly created surface its corresponding front surface. This new Cell inherits the layer ids from the cell being advanced into. It is also assigned a new layer id which represents the layer just created.
   d. Smooth and seam the newly advanced faceted surface with its neighboring surfaces.
6. Create constraints between the unmeshed voids through the connecting tubes.
7. Mesh each unmeshed void with either midpoint subdivision or T-Hex.
8. Sweep the connecting tubes.
9. Split the connecting webs as needed.
10. Send the entire mesh to a smoother for global smoothing. Smoothing is needed on curves and surfaces, in addition to the nodes on the interior of the volumes.

The concept of advancing unconstrained rows of quads and layers of hexahedra has been introduced through the algorithms of Unconstrained Paving and Unconstrained Plastering. The concept is most relevant with Unconstrained Plastering since it eliminates the problems of resolving highly constrained unmeshed voids which is common with most other advancing front hexahedral meshing algorithms.

The algorithms presented are able to mesh assembly models with conformal meshes with the penalty that all of the volumes/surfaces in the model must be meshed at the same time. Meshing all of the volumes in an assembly at once increases memory requirements since the mesh on the entire assembly will need to be in the mesher's internal datastructures at once, which are typically larger than mesh storage datastructures. Unconstrained Paving is also presented which is a potential improvement upon traditional advancing front quadrilateral meshing algorithms.

Modeling and simulation has become an essential step in the engineering design process. Modeling and simulation can be used during either the original design phases, or on assessment of existing designs. In either case, the end result is increased confidence in the design, faster time to market, and reduced engineering cost.

Quite a debate has emerged over the advantages and disadvantages of hexahedral verses tetrahedral elements. Tetrahedral meshes are typically much easier to generate. On complicated models with complex geometric features, the time savings on generating a tetrahedral mesh rather than a hexahedral mesh can be orders of magnitude with the current meshing technology. However, the benefit of hexahedral elements is that they often perform better in the analysis stage. A. O. Cifuentes, A. Kalbag, "A Performance Study of Tetrahedral and Hexahedral Elements in 3-D Finite Element Structural Analysis," *Finite Elements in Analysis and Design*, Vol. 12, pp. 313-318 (1992); S. E. Benzley, E. Perry, K. Merkley, B. Clark, "A Comparison of All-Hexahedral and All-Tetrahedral Finite Element Meshes for Elastic and Elasto-Plastic Analysis," *Proc. 4th Int. Meshing Roundtable*, 179-191 (1995); and ABAQUS Analysis User's Manual, Version 6.5, Section 14.1.1, Hibbit, Karlsson & Sorrensen: USA (2005).

As noted above, Paving has been shown to be a robust and efficient solution to the quadrilateral surface meshing problem. However, its three-dimensional extension, Plastering has not done the same for hexahedral mesh generation. Plastering calls for a pre-meshed boundary, which is created without considering global mesh topology. Fronts are then created, from which hexahedral elements are advanced into the solid in an element-by-element fashion. As fronts collide, complex configurations of closely-spaced randomly-oriented quadrilaterals yield complex unmeshed voids which Plastering is rarely able to resolve. As a result, traditional Plastering is able to completely mesh only simple primitive models with care-fully pre-meshed boundaries. Plastering's inability to mesh more complex solids stems from its element-by-element geometric approach and the added constraints of a pre-meshed boundary. Like Paving, Plastering considers only local element connectivites, with a high priority placed on incremental nodal placement and single element topology. Although this approach worked well in Paving for two dimensional surface meshing, the extra degree of freedom in three dimensions proves that more global consideration of hexahedral topology is required.

Learning from the experience of Plastering, Whisker Weaving was developed with an emphasis on global hexahedral topology. The concept of the dual, or Spatial Twist Continuum was key to the development of Whisker Weaving. Like Plastering, Whisker Weaving also starts from a predefined boundary quad mesh. Each quad on the boundary represents a whisker, or incomplete chord in the dual. The topology of the boundary quad mesh is traversed until groups of three or more boundary quadrilaterals are found whose corresponding whiskers could be advanced, or crossed, forming the topology of a single hexahedral element. The spatial locations of interior nodes are not calculated until the topology of the entire mesh is determined. Thus, formation of hexahedral element topology is guided by near-exclusive consideration of mesh topology logic. Geometric characteristics of the solid are considered secondary to the overall mesh topology. This is in stark contrast to Plastering which does nearly the opposite. Whisker Weaving is able to successfully generate hexahedral topology for a wide spectrum of solid geometries. However, because it leaves geometric positioning of interior nodes until after the entire mesh topology has been determined, Whisker Weaving is unable to make any guarantees on reasonable element quality. In practice, the element qualities produced by Whisker Weaving are rarely adequate, and are often inverted.

Research on Plastering and Whisker Weaving has shown that any algorithm which attempts to automatically generate hexahedral meshes must take both model topology as well as geo-metric model characteristics into consideration. Failure to consider geometric features of a solid will almost always result in poor element quality. Failure to consider global mesh and model topology will almost always result in a failure to generate a valid hexahedral mesh topology.

Unconstrained Paving and Plastering removes the constraint of a pre-meshed boundary. This allows the meshing process to consider more global model topologies without being constrained by local mesh anomalies. The domain is then systematically partitioned through the advancement of fronts. In traditional advancing front methods individual solid elements are generated by following geometric reasoning to build individual nodes, edges and faces, starting from a predefined boundary mesh and advancing inwards. In contrast, Unconstrained Paving and Plastering advance geometric layers or partitions in-dependent of element distribution. Unconstrained Paving and Plastering delay the final definition of elements until it is absolutely necessary, thus removing any artificial constraints that a pre-meshed boundary imposed.

Unconstrained Paving and Plastering partition the domain into regions classified based on the number of remaining degrees of freedom. The Spatial Twist Continuum defines quadrilateral elements as the intersection of two chords and hexahedral elements as the intersection of three chords. As such, a domain which is to be meshed with quadrilaterals must constrain two degrees of freedom for the entire domain corresponding to two chords required for each quadrilateral. Similarly, a domain which is to be meshed with hexahedra must constrain three degrees of freedom for the entire domain corresponding to the three chords required for each hexahedra.

FIG. 40 illustrates the meshing of a simple surface with Unconstrained Paving. Unconstrained Paving systematically partitions the surface into sub-regions which are classified as either:

unmeshed voids (white regions in FIG. 40, no degrees of freedom are con-strained),
connecting tubes (light gray regions in FIG. 40, one degree of freedom is con-strained), or
final elements (dark gray regions in FIG. 40, two degrees of freedom are con-strained).

For Unconstrained Plastering, the regions are classified as either:

unmeshed void (no degrees of freedom are constrained),
connecting tubes (one degree of freedom is constrained),
connecting webs (two degrees of freedom are constrained), or
final elements (three degrees of freedom are constrained).

Figure 40A:
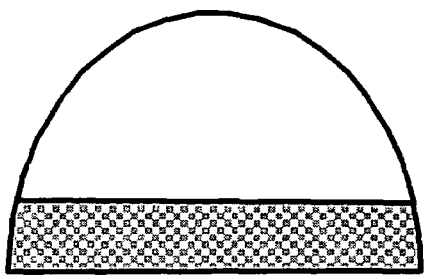
FIG. 40 illustrates that at all times the unmeshed void (white region) is connected to the boundary either by direct adjacency or through connecting tubes ((a) One row advanced; (b) Intermediate step; (c) Intermediate step; and (d) Final mesh)
Figure 40B:
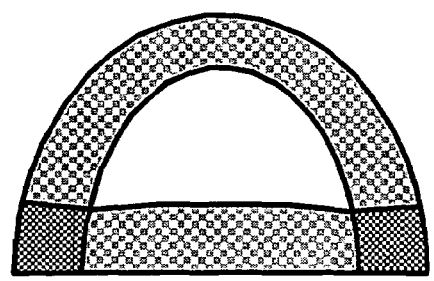
Figure 40C:
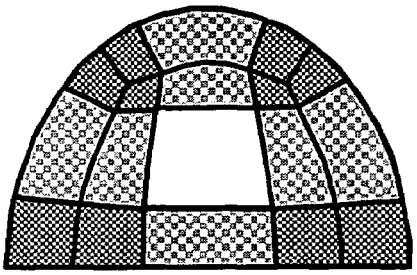
Figure 40D:
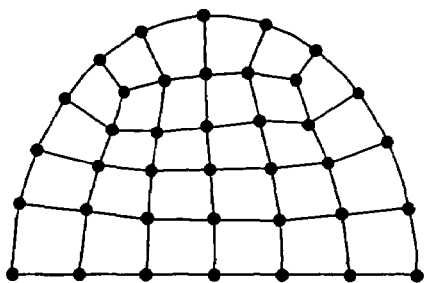

A front advancement as shown in FIG. 40*a* introduces an unconstrained row of elements with an undetermined number of quadrilaterals. The advancement of a row essential introduces a single new chord to the dual of the eventual mesh. However, the number of quads in this row or chord is left unconstrained at this point. Since a quadrilateral is the intersection of two chords, the insertion of a single new chord through a single front advancement does not uniquely determine any quadrilaterals unless the chord inserted happens to cross previously inserted chords. In FIG. 40*b*, an additional front is advanced inserting a second chord. At the bottom two corners, this newly inserted row crosses the previously advanced row, thus defining a quadrilateral element at each of the two row crossings.

FIGS. 40 *a*, *b*, and *c* illustrate that at all times, the unmeshed void (white region) is connected to the boundary either by direct adjacency or through connecting tubes. For example, in FIG. 40*a*, the unmeshed void is connected to one connecting tube on the bottom, and the surface boundary on the top. In FIG. 40*b*, the unmeshed void is connected to two connecting tubes, one on the top and one on the bottom. Likewise in FIG. 40*c*, the un-meshed void is connected to four connecting tubes (i.e., top, bottom, left and right). Thus, any of the curves on the unmeshed void can be split into as many mesh edges as needed for resolution of the void. Any splitting of the curves on the unmeshed void can be propagated back to the boundary through the connecting tubes.

Similarly in three dimensions with Unconstrained Plastering, all surfaces of the unmeshed void are connected to the boundary either by direct adjacency or through connecting tubes. As a result, any of the surfaces of the unmeshed void are free to be discretized as required for resolution. Any discretization of the surfaces of the unmeshed void can be propagated back to the boundary through the connecting tubes. This is in contrast to traditional Paving and Plastering where the unmeshed void is completely discretized at all times by either element edges or quadrilateral faces. This discretization proved to be the Achilles heal for traditional Plastering since the unmeshed void is typically discretized with closely spaced randomly oriented quadrilaterals. In general, Unconstrained Paving and Plastering continue advancement of rows and sheets until the unmeshed void can be meshed with Midpoint Subdivision.

Unconstrained Paving and Plastering rely heavily upon model topology by removing the constraint of the pre-meshed boundary, advancing unconstrained rows and sheets rather than single elements, and by following strict guidelines which consider global ramifications when local dual operations are performed. Unconstrained Plastering also considers geo-metric characteristics of the model by performing proximity and angle checks between nearby fronts, size checks to make sure that front advancements are consistent with desired element sizes, and layer checks to ensure that advancing fronts are boundary-sensitive. In addition, like traditional Plastering, Unconstrained Plastering advances rows in the primal space which provides access to direct geometric properties of the model and previously advanced rows. In contrast, Whisker Weaving operates in the dual space which is part of the reason geometric features are not considered. Through careful combination of both topological and geometric considerations, Unconstrained Plastering can be successful on arbitrary geometry assemblies.

Concavities are a common occurrence in even simple CAD models. A strict geometric definition of a concavity is anywhere on the model where the interior angle at a point is greater than 180 degrees. However, in a hexahedral meshing sense, a concavity is anywhere that has a large enough interior angle that three hexahedra would more accurately model the geometry than only two hexahedra. Submapping technology defines this condition as a "Corner".

Figure 41A:
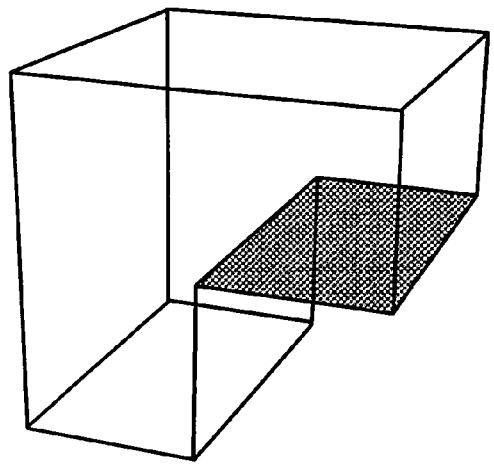
FIG. 41 is an example of an incomplete front ((a) shaded surface is an incomplete front; (b) ideal mesh; (c) hex layer adjacent to shaded surface; and (d) shaded surface is a complete front)
Figure 41B:
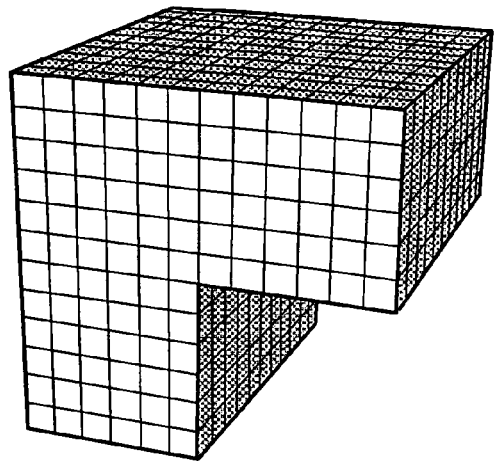
Figure 41C:
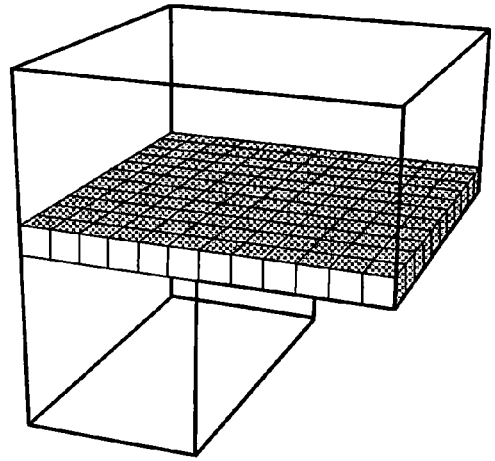

Unconstrained Plastering handles concavities through the definition and advancement of "incomplete fronts." FIG. 41a shows a simple solid with one of the surfaces highlighted. FIG. 41b shows what the ideal mesh would look like on this model. The left-most curve on the highlighted surface is a concavity in the model since each mesh edge on it has three adjacent hexahedra. FIG. 41c shows the sheet of hexes which is directly adjacent to the highlighted surface. Because of the concavity on the left-most curve, this sheet extends out into the interior of the solid.

Figure 41D:
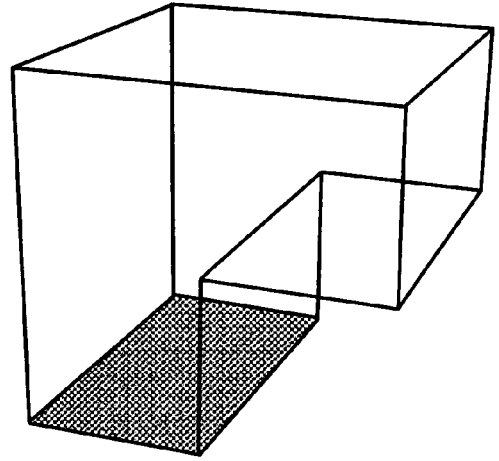
Figure 42A:
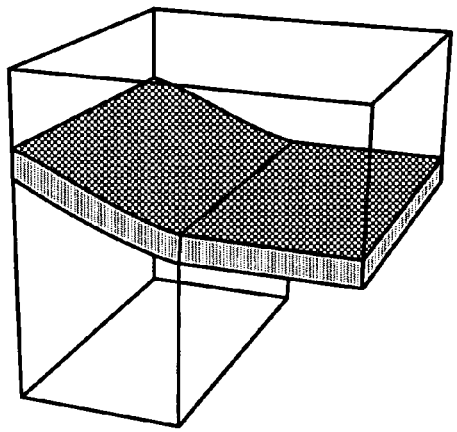
FIG. 42 shows various options and final resolution of incomplete front ((a) Arbitrary advancement option 1; (b) Arbitrary advancement option 2; (c) Arbitrary advancement option 3; (d) Only known advancement is performed; (e) After several more layers are advanced; and (f) Final sheet resolution of incomplete front)
Figure 42B:
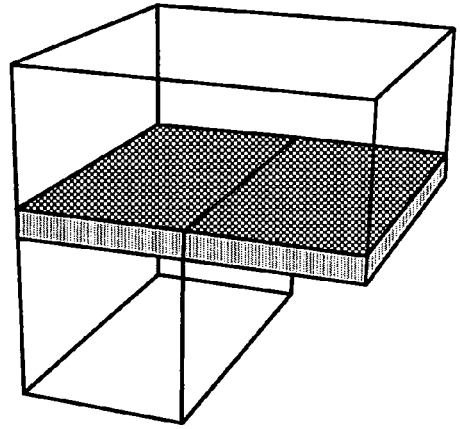
Figure 42C:
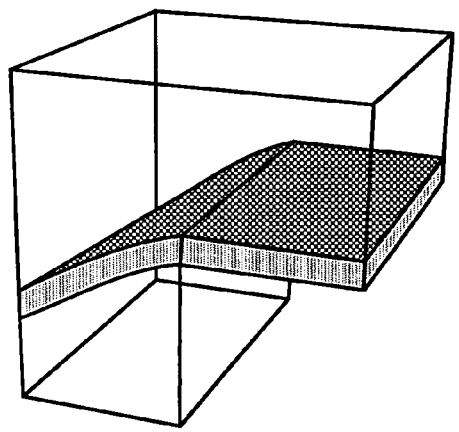
Figure 42D:
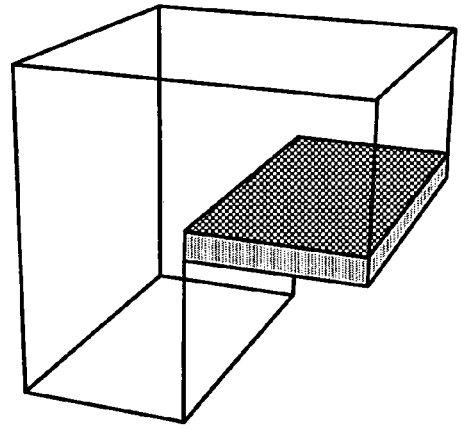
Figure 42E:
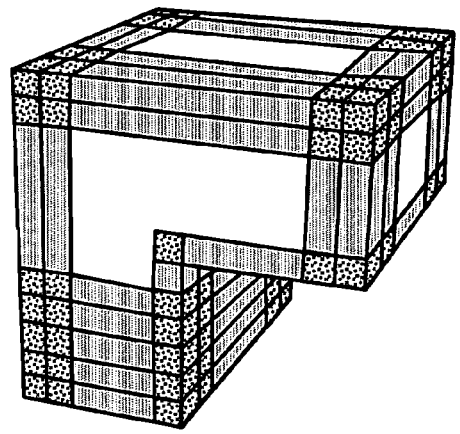
Figure 42F:
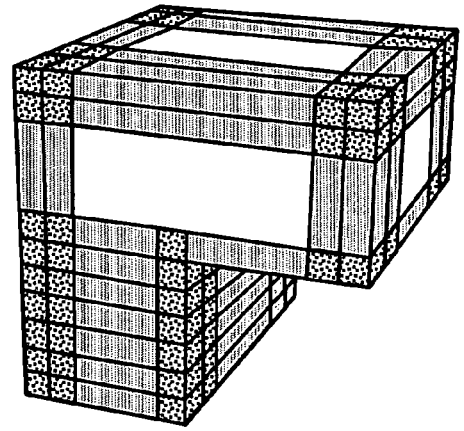

When Unconstrained Plastering begins, it initializes fronts from each of the boundary CAD surfaces. The highlighted surface in FIG. 41a would be initialized as a front to advance. However, because of the concavity, this front is marked as an incomplete front. In contrast, the highlighted surface in FIG. 41d would be initialized as a complete front since all of the curves on it are convex. The advancement of this or any other complete front entirely de-fines a single hexahedral sheet. This is accomplished because the topology of the model completely defines the path the sheet should take. However, the advancement of an incomplete front can only define the portion of the sheet directly in front of the surface(s) comprising the front. Any further advancement of the front would be arbitrary. FIGS. 42 a, b, & c shows three possible arbitrary advancements of a complete sheet from the incomplete front in this example. All three are valid, and the mesh in FIG. 41b demonstrates that the sheet in FIG. 42b is eventually used. However, choosing between them is not possible until other adjacent fronts are advanced. The recommended procedure for incomplete fronts is to advance the front to form a partial hex sheet, as shown in FIG. 42d, followed by advancement of other complete fronts in the model. FIG. 42e shows this simple example after several adjacent fronts are advanced. Notice that the incomplete front was advanced only once. FIG. 42f shows that by continuing to advance adjacent complete fronts, the incomplete front can be completed when adjacent fronts are advanced far enough to guide the incomplete hex sheet to completion.

Another option would be to completely refrain from advancing this incomplete front until adjacent fronts have been advanced far enough to "complete" the incomplete front. However, doing so would leave the boundary of the solid exposed to direct collisions from other advancing fronts. When fronts collide, seaming and merging is needed. Seaming and merging operations result in nodes and edges with non-optimal valences, which often results in poor element qualities. By performed seaming and merging directly on the model boundary the risk of creating poor elements directly on the model boundary is increased. Since analysis results are often of greater interest on the boundary, care must be taken to ensure as high an element quality as possible on the boundary. As such, the recommendation is that each incomplete front be advanced once in order to form a protective layer directly adjacent to the model boundary. After a single advancement, the incomplete front can wait until adjacent complete fronts are advanced far enough to complete the incomplete front.

As fronts are advanced in Unconstrained Paving and Plastering, certain operations must be performed. The operations that are performed most often are merging and seaming. Merging is defined as the resolution of small gaps between fronts. Seaming is defined as the resolution of small angles between adjacent fronts. Merging and seaming must be performed iteratively since merging often creates seaming cases; likewise seaming often creates merging cases.

Figure 43A:
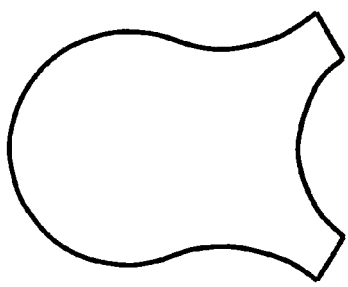
FIG. 43 shows a merging example for connecting tube proximity ((a) Example surface; (b) Several rows advanced; (c) Close-up view; (d) Desired front advancement; (e) Fronts merged; and (f) Additional fronts advanced)
Figure 43B:
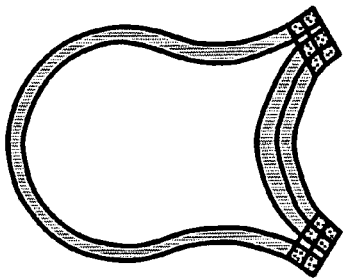
Figure 43C:
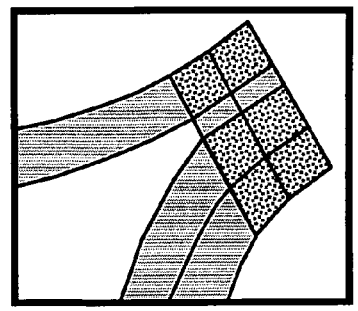
Figure 43D:
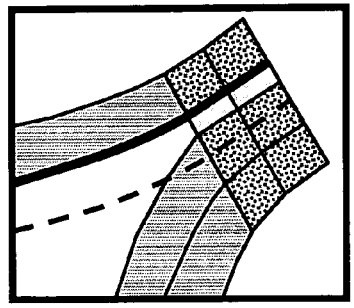
Figure 43E:
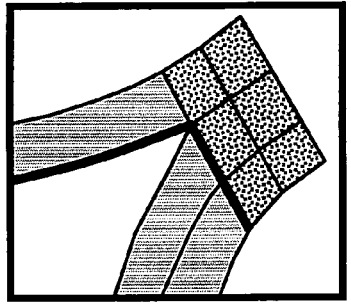
Figure 43F:
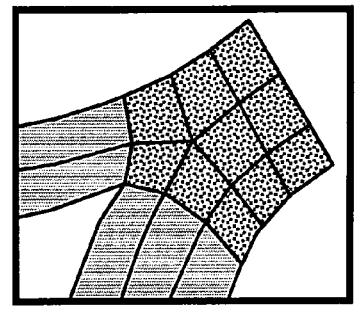

During Unconstrained Paving and Plastering, cases requiring merging occur in either the connecting tubes or in the unmeshed void. FIG. 43 illustrates the partial meshing of an ex-ample surface using Unconstrained Paving. FIG. 43c shows a close-up of a connecting tube which is too skinny for an additional advancement. In FIG. 43d, the solid dark line represents the front to advance. The dashed dark line represents the desired advanced location of this front, which clearly shows the proximity problem which must be resolved before continuing. FIG. 43e shows how the proximity can be resolved by collapsing out the connecting tube, with the solid dark line representing the modified front after merging. FIG. 43f shows what the model would look like after the advancement of additional fronts after the merge operation. Essentially, the merge operation inserts a 5-valent node in the quad mesh.

Figure 44A:
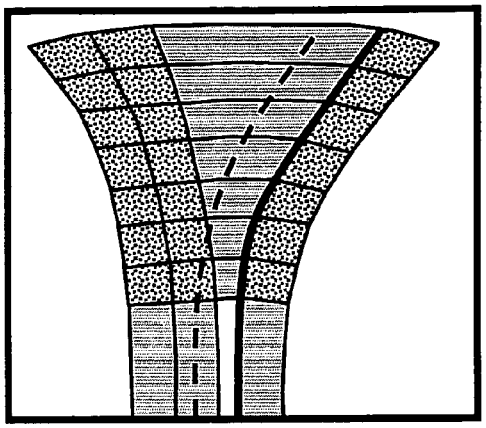
FIG. 44 illustrates merging partial tube proximity problems with pillowing ((a) Desired front advancement; (b) Pillow added; (c) Row smoothing; (d) Pillow added; (e) Row smoothing; and (f) Merge performed)
Figure 44B:
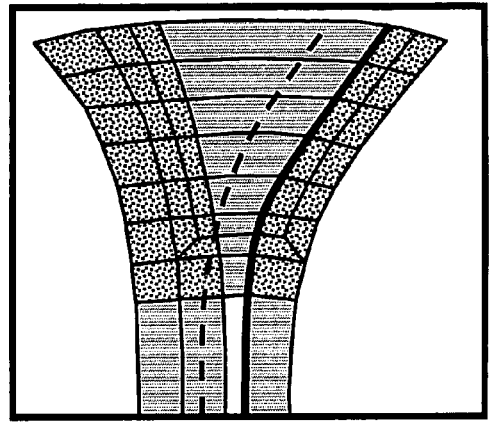
Figure 44C:
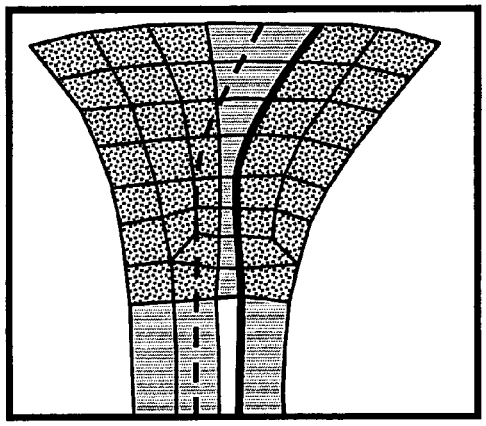
Figure 44D:
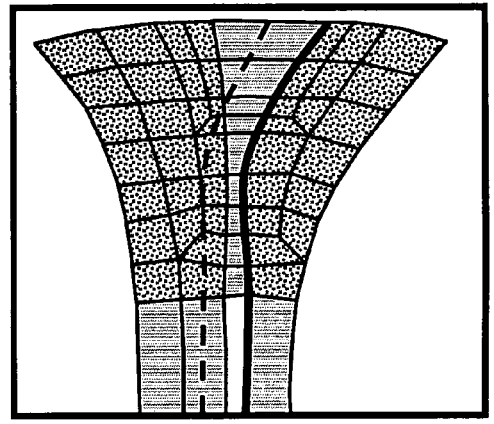
Figure 44E:
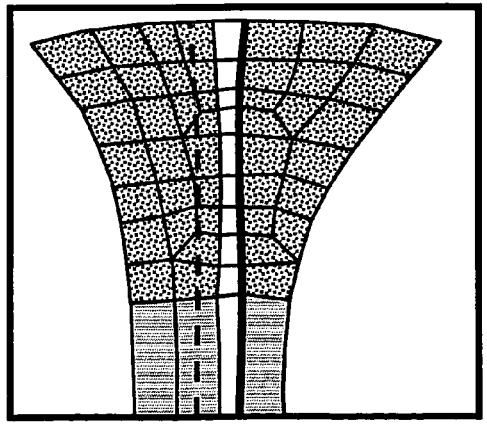
Figure 44F:
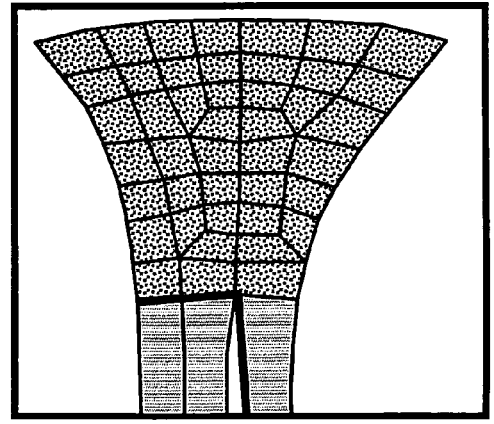
Figure 45A:
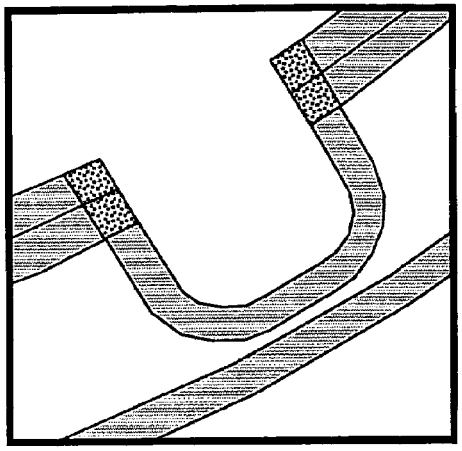
FIG. 45 shows a merging example for unmeshed void proximity ((a) Proximity case in unmeshed void; (b) Desired front advancement; (c) Merged model, A and B are new model constraints; (d) Cutbacks added; (e) New fronts for advancement; and (f) Several additional fronts are advanced)
Figure 45B:
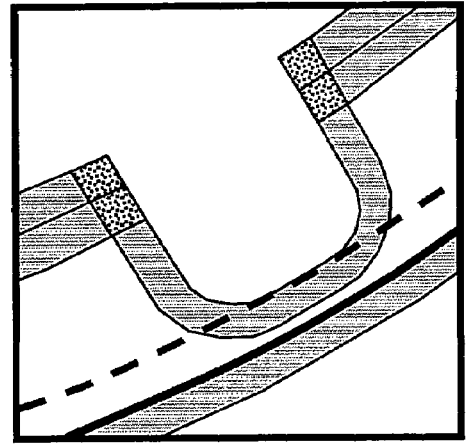
Figure 45C:
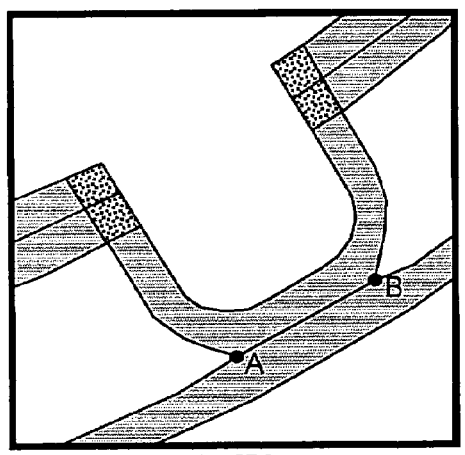
Figure 45D:
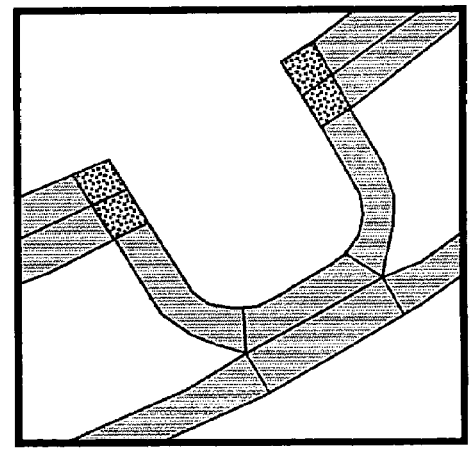
Figure 45E:
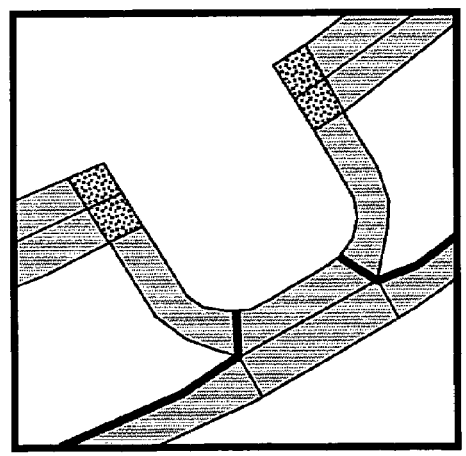
Figure 45F:
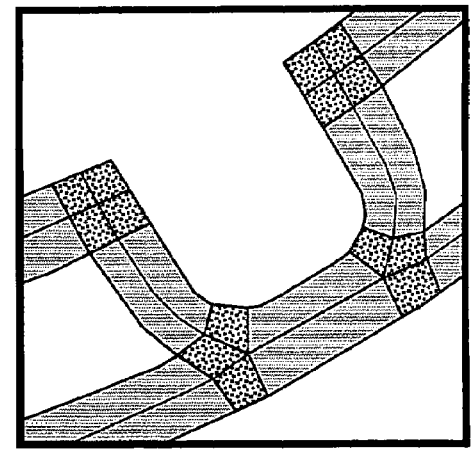

FIG. 43c shows the connecting tube which must be collapsed. In this case, proximity problems exist throughout the entire connecting tube. As a result, it makes geometric sense to collapse the entire tube. However, on other geometries, it is possible that the connecting tube might expand in some regions, making proximity only an issue for a portion of the tube. This is illustrated in FIG. 44a. However, regardless of the geometric proximity, if part of the tube requires collapsing, then the entire tube must be collapsed in order to keep topological consistency throughout the model. In order to reconcile sizing in cases where only part of the tube has proximity, pillowing [ ] can be performed to make the tube sizes more consistent. FIG. 44 illustrates that pillowing followed by row smoothing'can be performed in the connecting tubes to make the size of the tube consistent so the entire tube can be merged.

Merge cases can also occur in the unmeshed void as illustrated in FIG. 45. The thick dark solid line in FIG. 45b is the front to be advanced. The dashed dark line shows the desired advancement which is not possible because of the proximity. FIG. 45c shows that the proximity has been merged out. Points A and B are the extremes of the merge and are new topological constraints on the model where nodes must be placed. They will end up being 5-valent nodes in the final mesh. In order to maintain mesh topology consistency, these points must be propagated back to the boundary through the connecting tubes as shown in FIG. 45d. The propagation of constraints to the boundary through connecting tubes is called "cutbacks." Cutbacks split the connecting tube into two or more connecting tubes. The original front that had the proximity problem then needs to be updated as shown in FIG. 45e. Additional fronts can then be advanced around the proximity as shown in FIG. 45f.

Figure 46A:
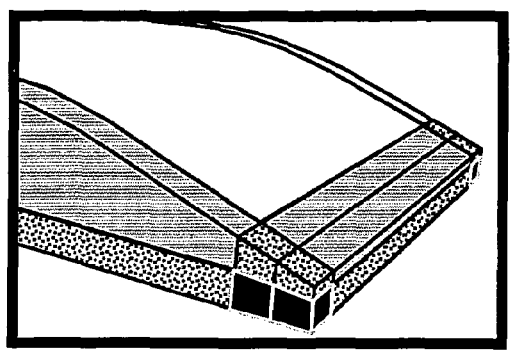
FIG. 46 illustrates an Unconstrained Plastering merge case ((a) 3D Merge Case; (b) Merge performed; and (c) Additional sheet advanced)
Figure 46B:
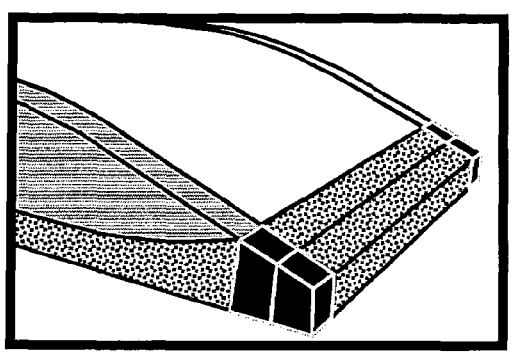

FIG. 46 illustrates a merge case in the connecting tubes during Unconstrained Plastering. The unmeshed void is drawn in white, the connecting tubes in light gray, the connecting webs in dark gray, and the final elements in black. Proximity in the connecting tube on the right stops additional sheets from advancing from both the top and bottom of the model. The proximity is resolved by merging out the connecting tube and the corresponding connecting webs in FIG. 46b.

Figure 46C:
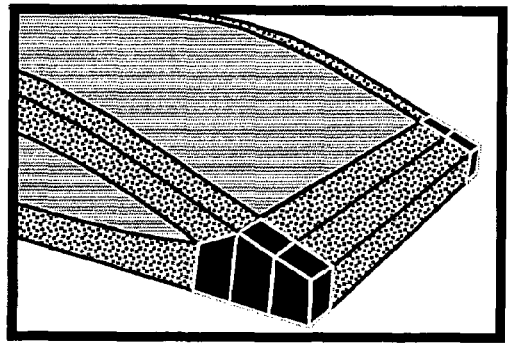

An additional front from the top of the model can now be advanced as illustrated in FIG. 46c.

Figure 47A:
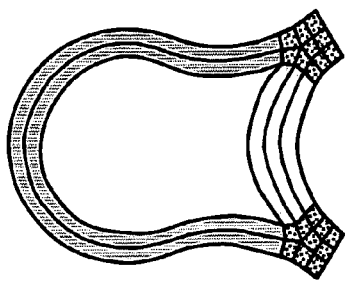
FIG. 47 shows an Unconstrained Paving seaming example ((a) Example surface; (b) Check for seaming at intersection of fronts; (c) Angle of intersection determines if seaming is required; (d) Seaming is performed until angle increases; (e) Cutbacks are added and fronts updated; (f) Additional fronts are advanced; (g) Connecting tube behind seam no longer touched unmeshed void; and (h) Final mesh in seaming region)
Figure 47B:
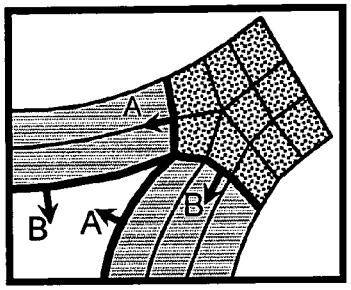
Figure 47C:
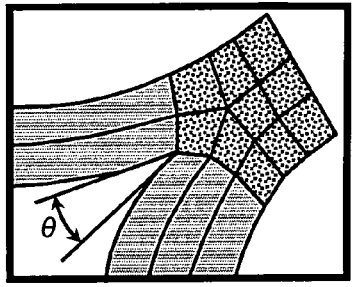
Figure 47D:
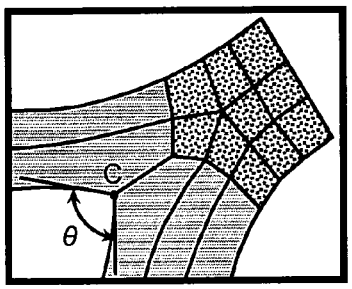

During Unconstrained Paving and Plastering, cases requiring seaming occur where two fronts intersect. The need for seaming is based on the angle at which the fronts intersect. FIG. 47a shows the model from FIG. 43 after the merging was performed. FIG. 47b shows a close up showing the intersection between fronts A and B. If the angle of intersection θ, is less than a specified tolerance β, then seaming is required. Seaming is performed, as shown in FIG. 47d, by merging the fronts together until the θ increases above β*w, where w is a weighting factor greater than 1.0. If w=1.0, then the angle will only increase to exactly the seaming tolerance. Subsequent small perturbations nearby could cause the angle to decrease which would cause seaming to be required again. If a larger w is used, such as 1.1, then θ will have increased enough over β that nearby changes will be less likely to drop θ enough to require additional seaming.

Figure 47E:
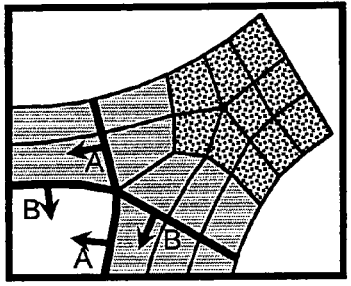
Figure 47F:
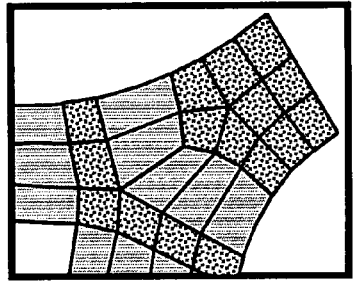

FIG. 47d illustrates the completion of the seam. Point C is the point where the seaming stops. Point C is a new constraint on the model where a five-valent node will be located. Similar to point A and B in FIG. 45c, point C must be propagated back to the boundary with cutbacks. FIG. 47e shows the addition of the cutbacks and the modifications to fronts A and B. FIG. 47f shows the model after fronts A and B have both been advanced one additional row.

Figure 47G:
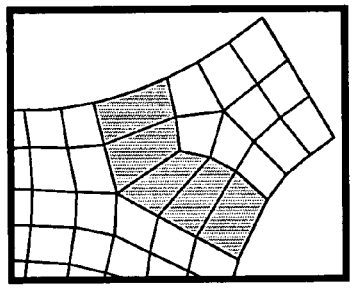
Figure 47H:
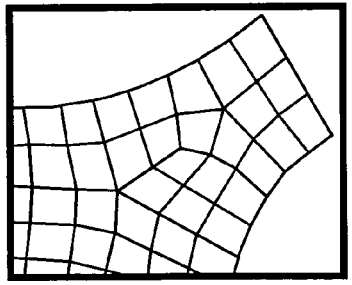
Figure 48A:
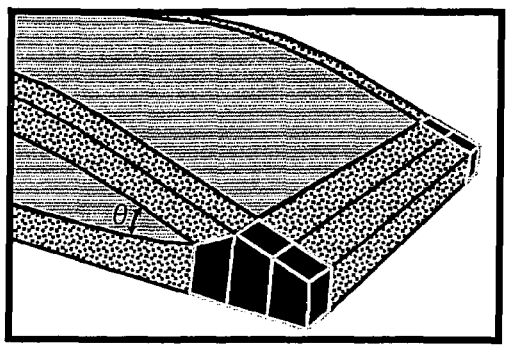
FIG. 48 shows an Unconstrained Plastering seaming example ((a) 3D Seam Case; (b) Seam with cutbacks performed; (c) Additional front advanced; and (d) Another seaming operation performed)
Figure 48B:
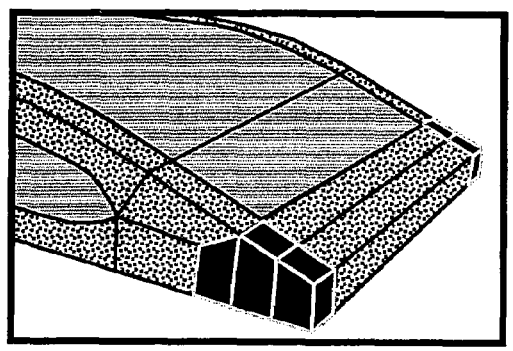
Figure 48C:
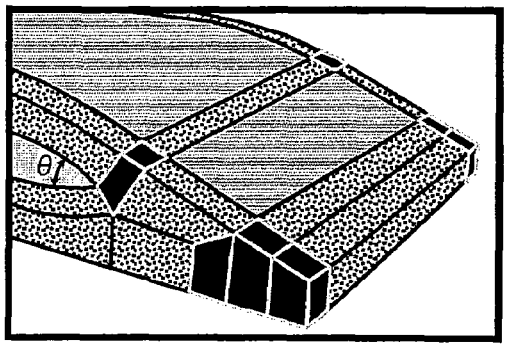
Figure 48D:
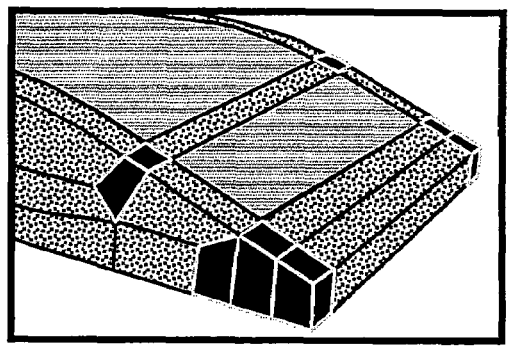

The highlighted region of FIG. 47g illustrates that cutbacks in seaming often create a set of connecting tubes which are no longer connected to an unmeshed void. These connecting tubes are like all other connecting tubes in that they still have one degree of freedom remaining for Unconstrained Paving and two degrees of freedom for Unconstrained Plastering. For Unconstrained Paving, these connecting tubes can be diced as many times as required to get the proper element resolution as shown in FIG. 47h. For Unconstrained Plastering, these connecting tubes which are no longer connected to an unmeshed void represent a partition of the solid which can be meshed with traditional paving and sweeping.

FIG. 48 Illustrates a seaming case in Unconstrained Plastering which is a result of the merge operation performed in FIG. 46. After the seaming operation is performed, an additional sheet is advanced as illustrated in FIG. 48c. This sheet advancement creates an additional seaming case which is seamed as illustrated in FIG. 9d. As illustrated in FIGS. 47g and h, connecting tubes that no longer touch an unmeshed void are often created during seaming. This is also the case in three dimensions with Unconstrained Plastering. The two light gray surfaces on the top of the model in FIG. 48d represent two such connecting tubes. These two light gray surfaces can be meshed with quadrilaterals and swept through the corresponding connecting tube to obtain the final mesh. By definition, the topology of connecting tubes in three dimensions has only a single source and a single target, which simplifies the sweeping process to 1-1 sweeping.

Conceptually, Unconstrained Paving and Plastering can handle a wide variety of model complexity. The logic is available to handle concavities, small model angles, collisions between fronts, seaming of adjacent fronts, and assembly models.

Figure 49:
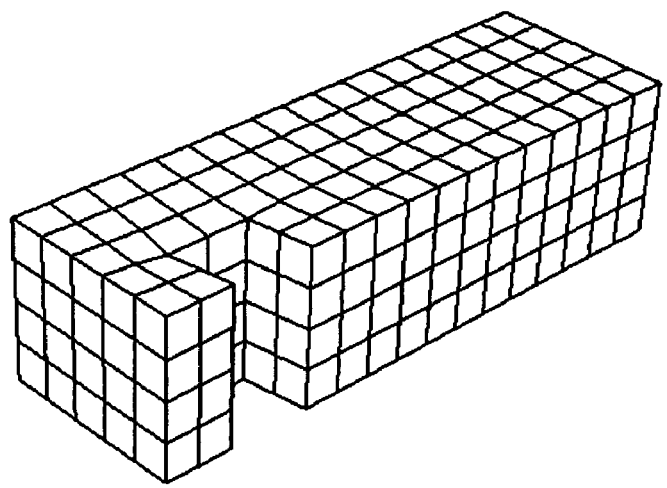
FIG. 49 shows another example model.

FIG. 49 shows a seemingly simple model meshed with Unconstrained Plastering. However, the concavity requires the use of incomplete fronts. In addition, merging in both connecting tubes and in the unmeshed void were required. As expected, the resulting mesh topology is that of a submapped mesh. The minimum scaled Jacobian in this mesh is 0.92 on a scaled from 0.0 to 1.0 where 1.0 is the perfect hexahedral element.

Figure 50:
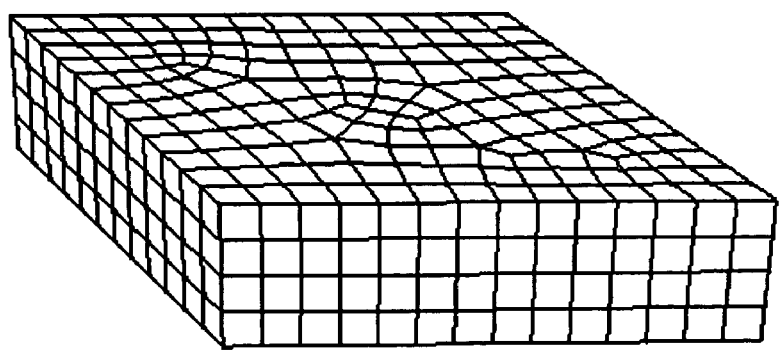
FIG. 50 shows a further example model.

Unconstrained Plastering meshed the model in FIG. 50 with a minimum scaled Jacobian of 0.62. The topology of the model is that of a simple brick, however, the top surface has the shape of a rhombus, which results in non-perpendicular angles leading to lower quality elements and some irregular transitioning nodes on the top and bottom surface. The mesh topology of the mesh is that of a swept mesh.

Figure 51:
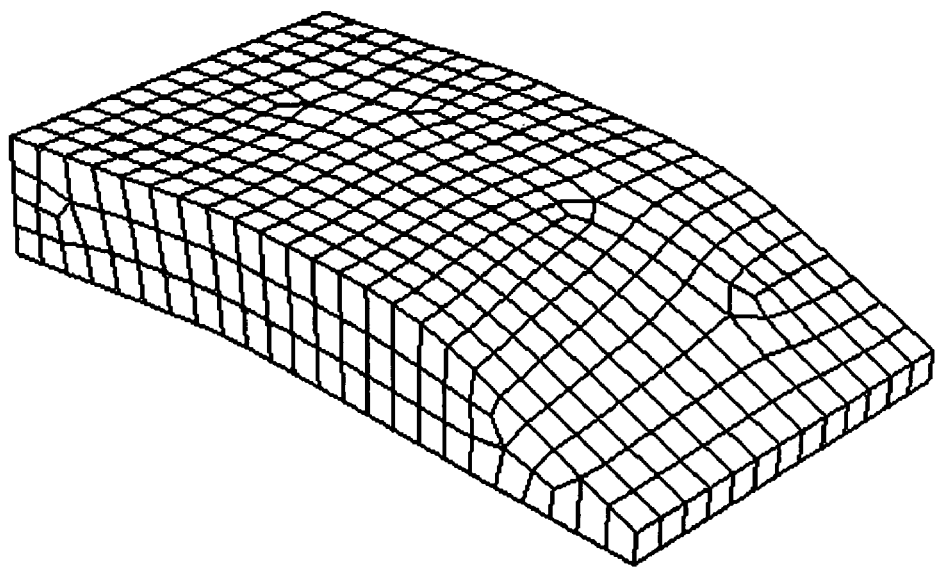
FIG. 51 shows yet another example model.

FIG. 51 illustrates a model which is also relatively simple. The top surface is a curved nurb. The tapered end caused the merging and seaming cases illustrated in FIG. 46 and FIG. 48 to arise which resulted in the irregular nodes on the side of the volume. The irregular nodes on the top of the model are introduced by the quad mesher which meshes the top surface of a connecting tube which is then swept as described in section 4.2. The mini-mum scaled Jacobian in this mesh is 0.577. The mesh topology is neither mapped nor swept, but a true unstructured mesh topology. Although the model topology of this model could yield a swept mesh topology, this example illustrates that Unconstrained Plastering is not restricted to such simple mesh topologies. Rather, Unconstrained Plastering is free to insert hexahedral sheets into the solid as required to adequately model the geometric complexity.

Figure 52A:
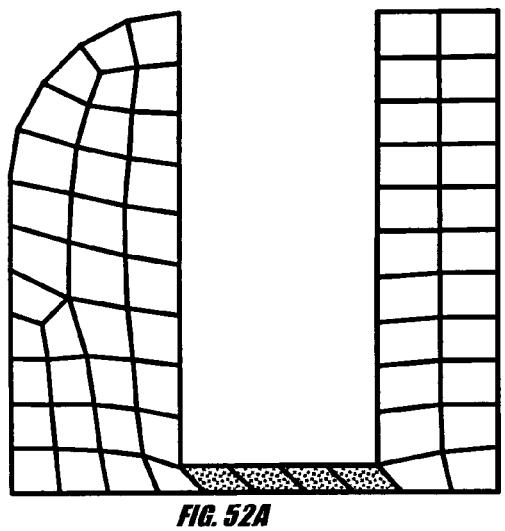
FIG. 52 is a mesh comparison between traditional Paving (a) and Unconstrained Paving (b)
Figure 52B:
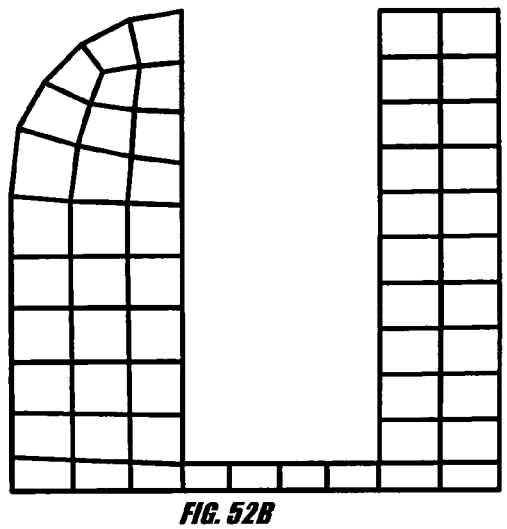

Unconstrained Paving behaves much better than traditional Paving on surfaces that have skinny regions as illustrated in FIG. 52. FIG. 52a shows the result from traditional Paving. Since the boundary edges are meshed apriori, the nodes are placed without considering proximity to other curves. As a result, the gray elements illustrate that skewed elements often result in thin sections such as this. FIG. 52b shows what a more desirable mesh would be where the nodes opposite the thin section line up. Since Unconstrained Paving is not constrained by an apriori boundary mesh, it is anticipated that the cutback process resulting from the merging in this region will result in a mesh similar to that in FIG. 52b.

An alternate method for the resolution of front collisions is next described. Front collisions are categorized as either:
1. Merge case—fronts collide based on a small distance between them.
2. Seaming case—fronts collide based on a small angle between them.

The resolution of both of these cases are also resolved by modifying the paths of the fronts involved to eliminate the gap or small angle between them (see FIGS. 43e, 44f, 45c, 46b, 47d, 48b, and 48d).

Experience with this method of handling front collisions has found the following issues:
1. Separation of Merging and Seaming as separate modules requires the process to be iterative
2. Resolution by elimination of the gap necessitates smoothing. In the case of seaming, the smoothing operation may necessitate additional seaming, resulting in an iterative process with smoothing inside the iterative loop.

Both of these issues make the resolution of front collisions as proposed above iterative and excessively dependent on smoothing, resulting in excessive computational expense. In order to reduce the computational expense of front collision resolution, an alternative approach is next described. This approach has the following main features:

The tolerances used to detect proximities are increased in order to detect proximities earlier. Previously the tolerance to a detect proximity case that must be resolved was α, as defined by Equation 1, where E is the desired element size for the mesh.

$$\alpha = 1.0 * E \qquad \text{Equation 1}$$

In the alternative approach, α is increased as defined by Equation 2. In addition, the alternative approach uses an additional tolerance λ as defined by Equation 3. λ is used to identify proximities cases which could be merged if adjacent to other proximities which are within α, but could also be left unresolved if needed. In essence, proximity cases which fall between α and λ identify the "gray-area" of proximities. How they are dealt with depends on other proximities detected nearby.

$$\alpha = 1.4 * E \qquad \text{Equation 2}$$

$$\lambda = 1.8 * E \qquad \text{Equation 3}$$

Next, rather than collapsing the distance between adjacent fronts as described above, the gap is now filled with an additional row (for Unconstrained Paving), or sheet (for Unconstrained Plastering) between the colliding fronts.

Finally, the process described above iteratively seams a small angle closed until the angle increases above β*w. After a seaming operation, smoothing is required to improve element qualities, which could result in the angle dropping again below β, necessitating additional smoothing. This seaming process is discarded in favor of the insertion of a mapped-triangle pattern in the small angle, which will be illustrated in the examples below.

This specification next details several examples which illustrate the alternative procedure for resolution of front collisions.

Figure 53A:
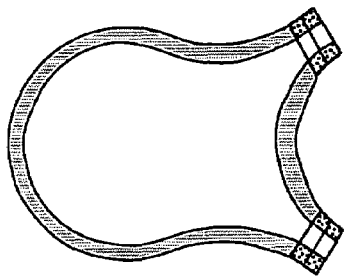
FIG. 53 shows an example model using an alternative collision detection paradigm ((a) Several rows advanced; (b) Desired front advancement; (c) proximity filled with row; (d) Remainder of front is advanced; (e) Another front is advanced; (f) A small angle is detected; and (g) Triangle section in angle)
Figure 53B:
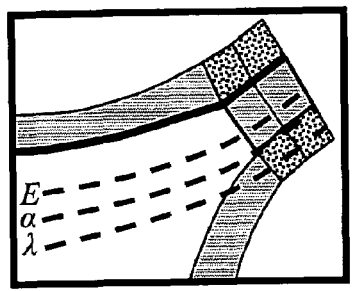
Figure 53C:
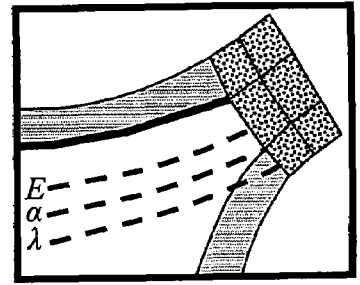

FIG. 53a contains graphical representation of this example. FIG. 53a shows a simple model after several fronts have been advanced. Compared to FIG. 56b, note that one fewer front has been advanced. This is due to the increase in proximity tolerances described above. Because of the increased tolerances, proximity situations are detected sooner than in the earlier embodiment. FIG. 53b shows a close-up of the right corner of the model illustrating that the desired front has proximity that must be resolved. FIG. 53c shows the resolution of this proximity. The difference between FIGS. 53b and 53c is subtle, but significant. Notice that the color of two of the cells on the far right of FIG. 53c. The initial color denotes cells that have only a single degree of freedom constrained. The new color denotes cells that have both degrees of freedom constrained. As such, the resolution of this proximity is done by simply constraining the connecting tube cells containing the proximity in their remaining degree of freedom. This converts the connecting tubes to final elements. Also, notice that the dark black line representing the front to advance has been trimmed in FIG. 53c since the new color cells are already constrained completely.

Figure 53D:
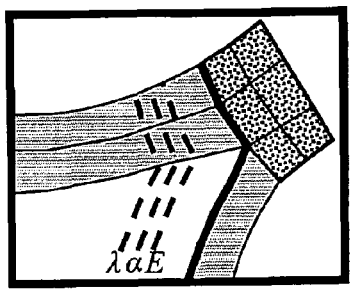
Figure 53E:
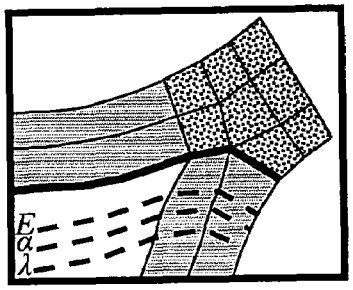
Figure 53F:
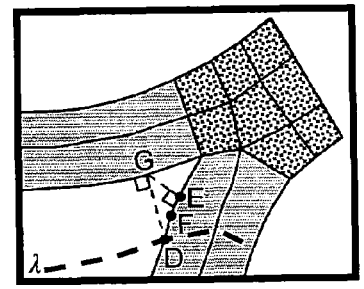
Figure 53G:
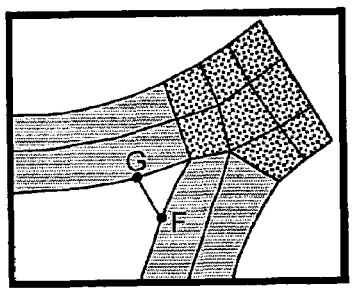

FIG. 53d shows the advancement of the remainder of the front which had the original proximity. FIG. 53e shows an additional front advance, which creates a small angle problem. As illustrated in FIG. 53f, point D is identified as the intersection of the λ tolerance line with the curve in proximity. This point is projected to the front being advanced to get point G. Point G is then projected back to the curve in proximity to get point E. The curve segment between point D and E is then bisected to get point F. A line segment is created which connects points F and G to form a triangular shape in the angle being resolved.

There are two options for resolving this triangular shape into a quadrilateral shape. Option 1 is used if the curves creating the angle are a sufficient distance away from the boundary giving freedom to relocate the boundaries of the triangle. Option 2 is used if the angle is close enough to the boundary that relocating the boundaries of the triangle is not possible.

Figure 54A:
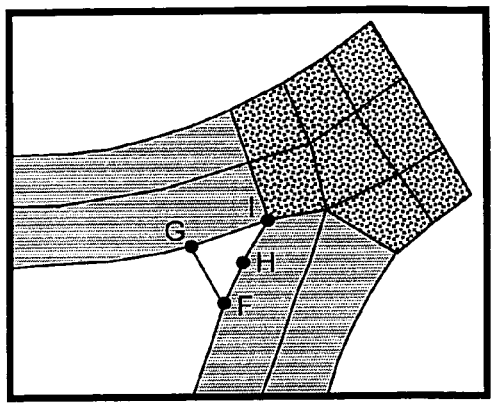
FIG. 54 shows the example of FIG. 52 with single quad insertion ((a) Triangle filled and edge split; (b) Triangle converted to quad; (c) Remainder of front is advanced; and (d) Final mesh)
Figure 54B:
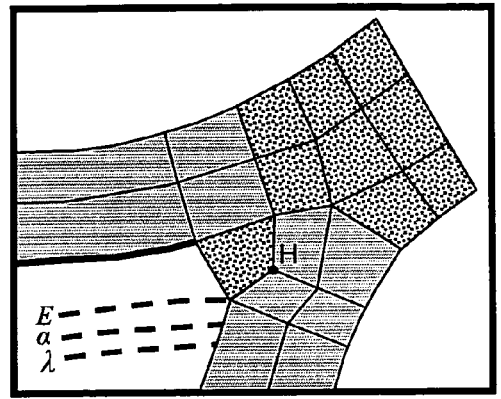
Figure 54C:
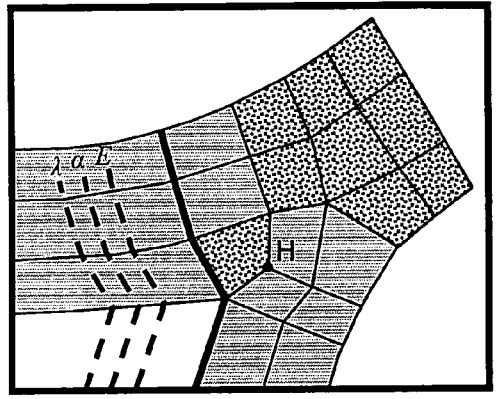
Figure 54D:
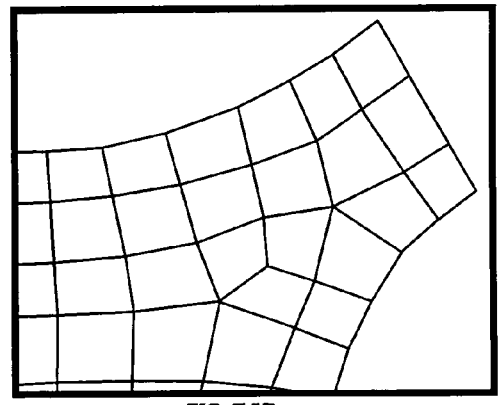

Option 1 begins by comparing the length of curve IF and IG. The longer of the two is bisected to form point H as shown in FIG. 53a. Cutbacks to the boundary are added for points G, F, and H and point H is relocated along the corresponding cutback to reshape the triangle into a quadrilateral, as shown in FIG. 54b. The new quadrilateral shape is dark gray in FIG. 54b since both of its degrees of freedom are constrained. The remainder of the front in proximity is then advanced as illustrated in FIG. 54c, along with additional front advancements, with the final mesh on this part shown in FIG. 54d.

Figure 55A:
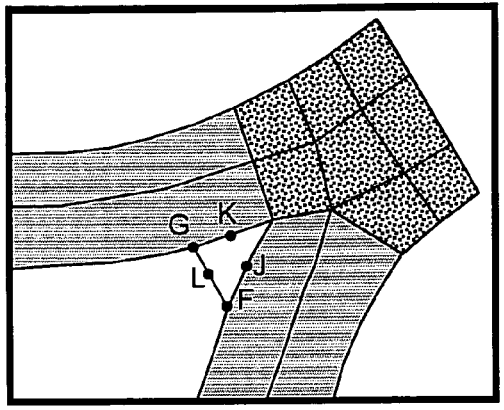
FIG. 55 shows the example of FIG. 52 with triangle mapped pattern insertion ((a) Triangle filled and all edges split; (b) Triangle mapped pattern inserted; (c) Remainder of front is advanced; (d) Additional front is advanced; and (e) Final mesh)
Figure 55B:
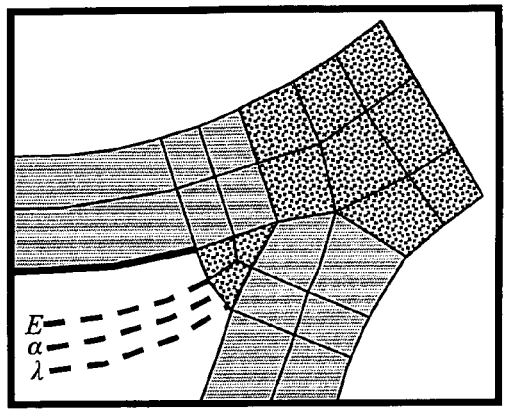
Figure 55C:
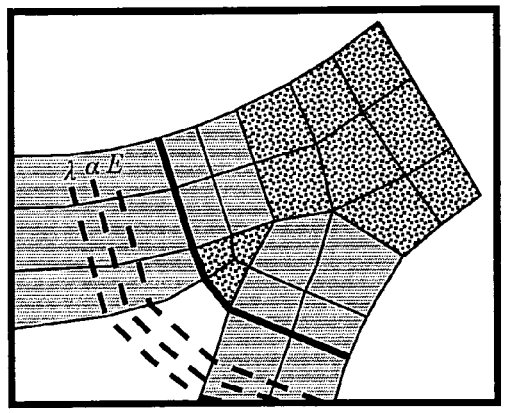
Figure 55D:
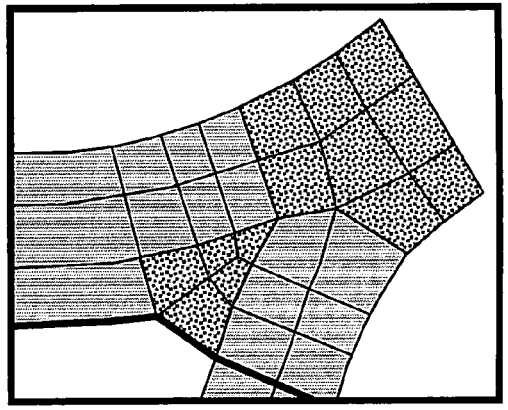
Figure 55E:
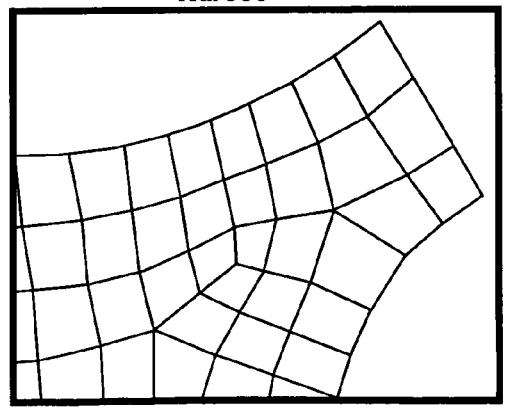

Option 2 begins by first bisecting all 3 sides of the triangle to form points K, J, and L as seen in FIG. 55a. The triangle is then filled with a tri-mapped pattern of three quadrilaterals, along with adding cutbacks of points F, G, J, K, and L to the boundary as illustrated in FIG. 55b. Additional fronts are then advanced as shown in FIGS. 55c and 55d, with the final mesh in FIG. 55d.

Figure 56A:
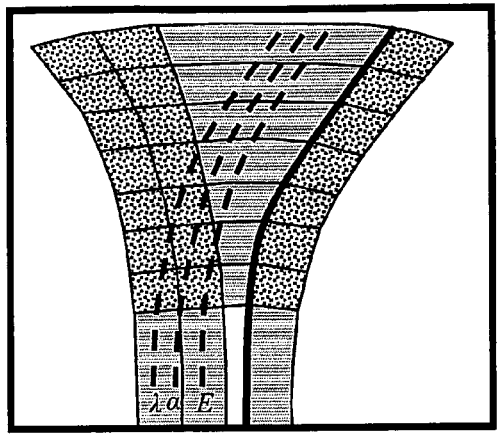
FIG. 56 shows another example using alternative collision resolution ((a) Partial proximity in a connecting tube; (b) Pillow inserted; (c) Another pillow inserted; and (d) Final mesh)
Figure 56B:
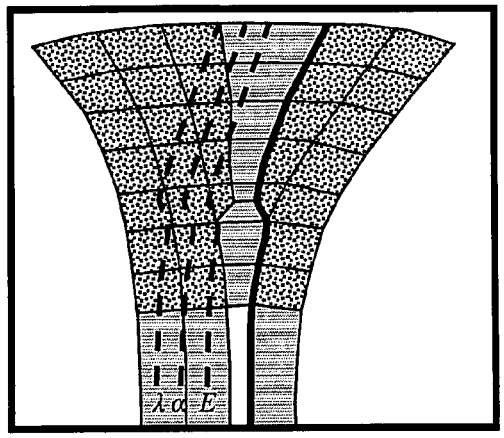
Figure 56C:
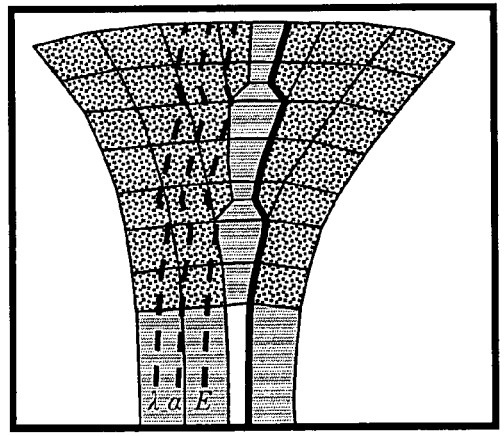
Figure 56D:
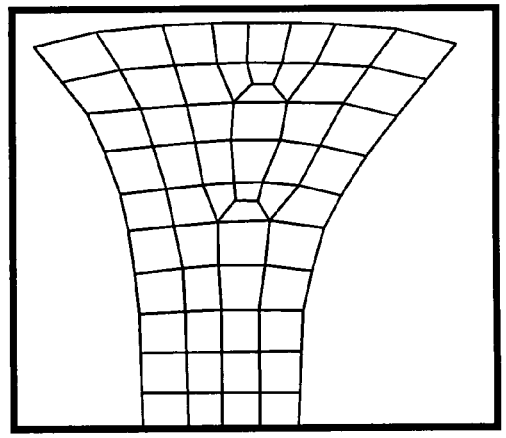

FIG. 56a illustrates a surface after numerous fronts have been advanced. The thick black line represents the next front to advance along with the desired advance location E and the proximity tolerance lines α and λ. In this case proximity only occurs in part of the connecting tube. In the first embodiment, pillowing was performed to reduce the size of the oversized part of the connecting tube. Here pillowing is also used, as shown in FIGS. 56b and 56c. However, unlike the first embodiment, the pillow only pillows the cells in the connecting tube, whereas the first embodiment pillows the cells in the connecting tube along with some of the adjacent tubes. In the first embodiment, adding adjacent cells into the pillow was required, since in the end the proximity was going to be collapsed, which would have created doublets if the pillow was confined to the connecting tube alone. However, since in the new proximity resolution method, a new row is inserted in the proximity rather than collapsing out the proximity, no doublets will result allowing the pillows to be localized to the connecting tube alone.

Figure 57A:
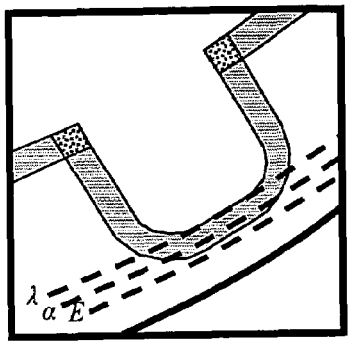
FIG. 57 shows a further example using alternative collision resolution ((a) Proximity in unmeshed void; (b) Limits of proximity defined; (c) Proximity filled with new row; (d) Cutbacks added; (e) Remainder of front advanced; (f) Adjacent fronts advanced; and (g) Final mesh)
Figure 57B:
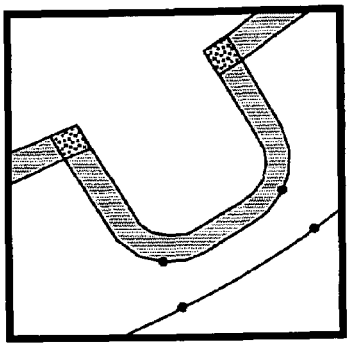
Figure 57C:
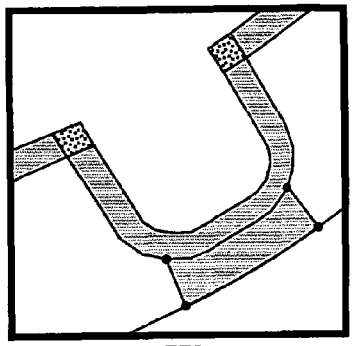
Figure 57D:
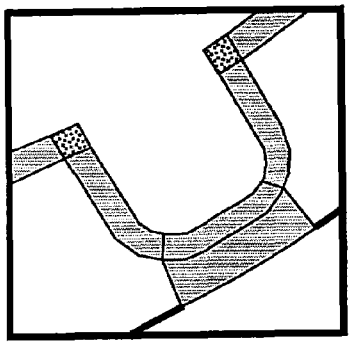
Figure 57E:
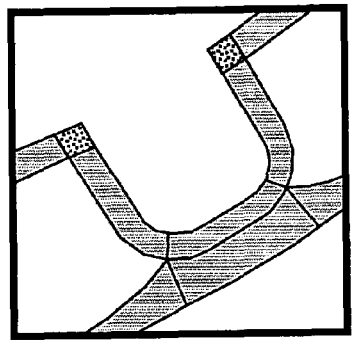
Figure 57F:
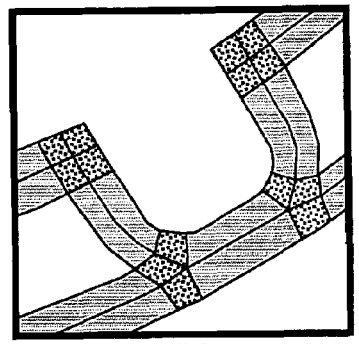
Figure 57G:
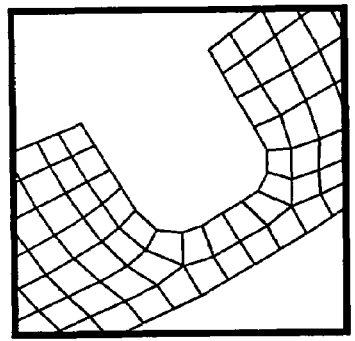

FIG. 57a illustrates a surface with several fronts already advanced. The thick black line represents the next front to advance along with the desired advance location E and the proximity tolerance lines α and λ. In contrast to FIG. 45a, the bottom front has not yet been advanced. This is because of the increased proximity tolerances α and λ. With the smaller tolerances used in the first embodiment, this front would be advanced without considering proximity. FIG. 57b illustrates four points which define the limits of the proximity. These points are connected and a new sheet of elements is placed in the proximity between these limits as shown in FIG. 57c. Cutbacks are then added and the proximity region removed from the current front as illustrated in FIG. 57d. The remainder of the front is then advanced in FIG. 57e, along with other adjacent fronts in FIG. 57f, with the final mesh illustrated in FIG. 57g.

Figure 58A:
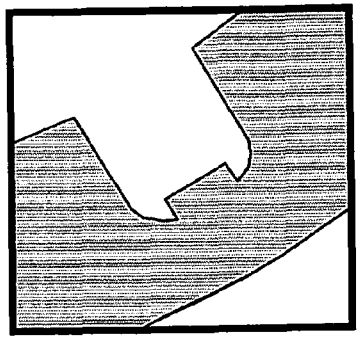
FIG. 58 shows a proximity case with extra geometric features ((a) Example surface; (b) Proximity case encountered; (c) Limits of proximity identified; (d) Geometric features A and B must be resolved; (e) Features are resolved with cutbacks; and (f) Final mesh)
Figure 58B:
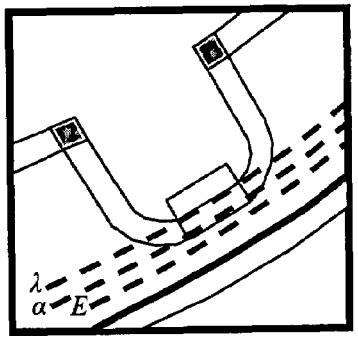
Figure 58C:
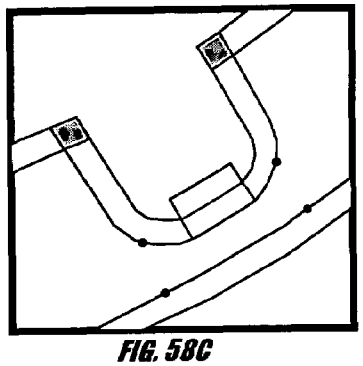
Figure 58D:
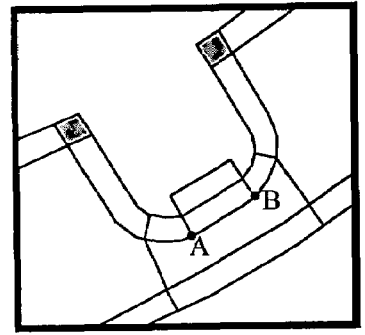
Figure 58E:
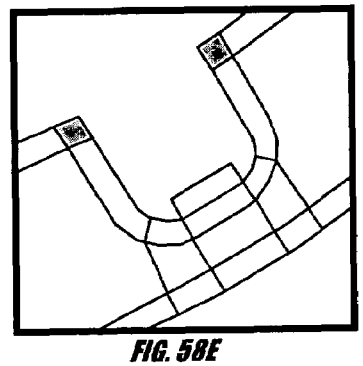
Figure 58F:
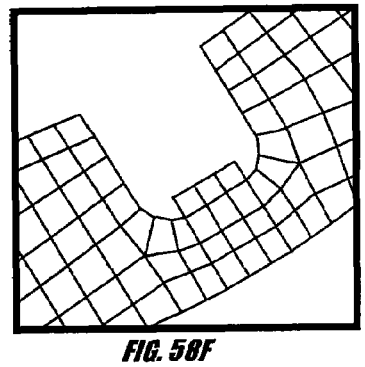

The surface in FIG. 58a is very similar to the surface in FIG. 53. The difference is an extra geometric feature in the proximity region. FIG. 58b shows several fronts advanced until proximity is encountered. In FIG. 58c, the limits of the proximity are identified. In FIG. 58d, the proximity is filled with a new row up to the limits. Points A and B are geometric features which must be resolved through the proximity. FIG. 58e shows how these points can be propagated to the other side of the proximity and out to the boundary through cutbacks. The final mesh on this model is seen in FIG. 58f. In this example, geometric features were found on the top of the proximity. In reality, geometric features such as this will often be found on both sides of the proximity. In these cases, all geometric features must be propagated to the other side of the proximity and out to the opposite boundary. In some cases, the projection of one geometric feature on one side of the proximity may lie close enough to an existing feature on the opposite side of the proximity that the two geometric features can be paired together.

Figure 59A:
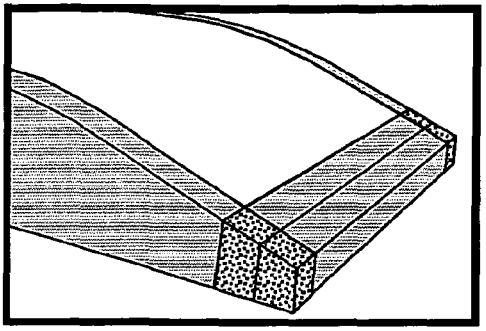
FIG. 59 shows a three-dimensional example of the alternative proximity resolution scheme ((a) Fronts advanced until proximity is detected; (b) Proximity is resolved by adding constraints; (c) Remainder of front is advanced; (d) Triangle pattern is inserted in angle; (e) Top front is advanced; (f) Proximity resolution eliminates unmeshed void; and (g) Final mesh).
Figure 59B:
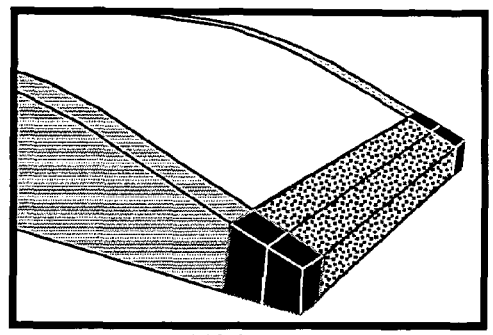

FIG. 59a illustrates a 3D model with several fronts already advanced. The next front to advance is the front on the bottom surface of the model. However, proximity exists in the tapered end of the model, which must be resolved before advancing. FIG. 59b shows the resolution of this proximity. Similar to the example of FIG. 53, the resolution is subtle. The white cells are the unmeshed voids, having no degrees of freedom constrained; the light gray cells are the connecting tubes, having one degree of freedom constrained; the dark gray cells are the connecting webs, having two degrees of freedom constrained, and the black cells are the final elements having all three degrees of freedom constrained. The resolution of the proximity in FIG. 59b is performed by simply adding constraints to existing cells without any topological modification.

Figure 59C:
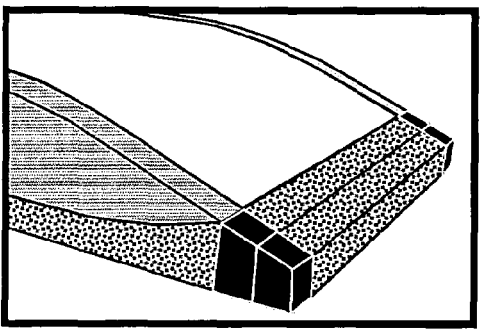
Figure 59D:
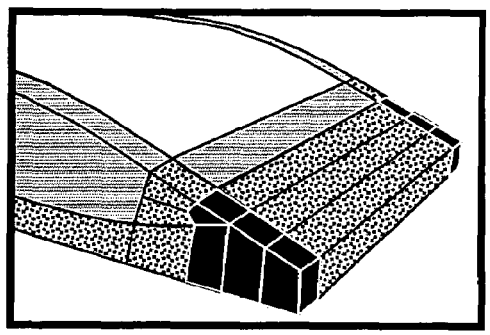
Figure 59E:
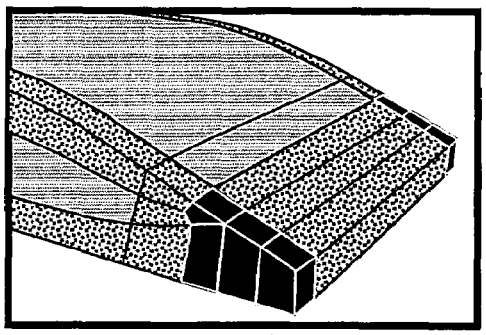
Figure 59F:
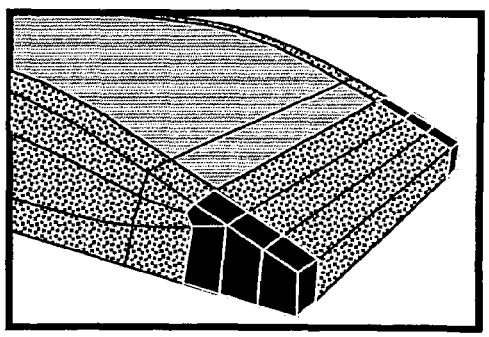
Figure 59G:
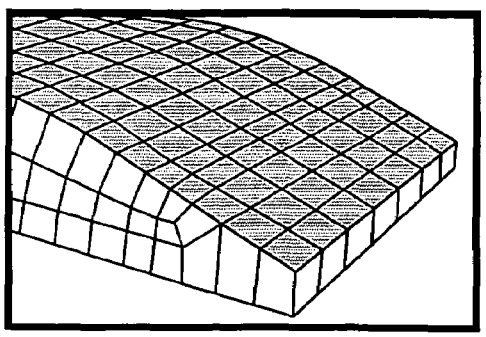

In FIG. 59c, the remainder of the bottom front is advanced. In FIG. 59d, a small angle is detected between the top front and the previously advanced front. This small angle is resolved by inserting a triangular mapped pattern into the small angle.

The examples from the first embodiment were re-worked using the alternative proximity resolution scheme described herein. In many cases, the mesh resulting from both the first and alternative embodiments are identical, however, there is no guarantee that this will always be the case. In general, the alternative scheme tends to find proximity problems earlier, giving the algorithm additional space to resolve the proximity.

In addition, the alternative scheme fills the void with one additional row (for Unconstrained Paving) or sheet (for Unconstrained Plastering). Adding this additional row/sheet is less disruptive to the surrounding mesh topology since previously-positioned nodes are not relocated during the proximity resolution process. In addition, since previously-positioned nodes are not relocated, the need for smoothing after proximity resolution is decreased, which in turn decreases the computational expense of proximity resolution. Finally, when using the proximity resolution described in the first embodiment, significant care was required to ensure that pulling the existing curves to close the proximity gap did not invert previously created element layers. This is not required using the new scheme, since previously-created curves are not moved during proximity resolution.

The proximity resolution method described in the first embodiment was based on the methods used in the original Paver. As such, it was natural that those same methods would be attempted with Unconstrained Paving and Plastering. However, research has shown that the decrease in computational expense of the proximity resolution scheme presented herein makes it superior.

The discussion above specifies that fronts should be advanced as long as the unmeshed void is twice the desired element size. The advancement of fronts can be terminated earlier if the unmeshed void can be identified as either: (1) a polyhedra which can be meshed with midpoint subdivision—a set of 13 such polyhedra are itemized in M. A. Price, C. G. Armstrong. "Hexahedral Mesh Generation By Medial Surface Subdivision: Part II. Solids with Flat and Concave Edges", *International Journal for Numerical Methods in Engineering*, 40, 111-136 (1997); or (2) a polyhedra which can be meshed with the traditional Pave and Sweep method as described above. If the unmeshed void is identified as either of these, it can be meshed simply using existing documented methods of midpoint subdivision or Pave and Sweep, after which the boundary mesh of the unmeshed void will be swept to the boundary through the connecting tubes.

The present invention is preferably implemented as software on a computer system, such as in an application coded in C++ on a laptop computer running the Microsft Windows® operating system or on a desktop computer running the Linux operating system. The invention can, of course, be implemented in any programming language (C, C++, Fortran, Java, etc.) and can be developed on any hardware platform that has a compiler for the chosen language.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of generating by computer a conformal all quadrilateral or hexahedral mesh representing a corresponding physical item, the method comprising the steps of, by computer:
   selecting an object representing the physical item with unmeshed boundaries;
   performing the following steps while unmeshed voids are larger than twice a desired element size and unrecognizable as either a midpoint subdividable or pave-and-sweepable polyhedra:
      selecting a front of a plurality of fronts to advance;
      based on sizes of fronts and angles with adjacent fronts, determining which adjacent fronts should be advanced with the selected front;
      advancing the selected and determined adjacent fronts;
      forming quadrilaterals or unconstrained columns of hexahedra where two unconstrained hexahedral layers cross; and
      establishing hexahedral elements where three unconstrained hexahedral layers cross; and
   outputting a resulting object that represents the physical item with a conformal all quadrilateral or hexahedral mesh.

2. The method of claim 1 wherein the performing step additionally comprises the step of performing layer smoothing and seaming and merging.

3. The method of claim 1 wherein the performing step additionally comprises the step of inserting tucks and/or wedges.

4. The method of claim 1 wherein the performing step additionally comprises the step of identifying unmeshed voids, connecting tubes, and connecting webs.

5. The method of claim 4 wherein the performing step additionally comprises the step of defining constraints between unmeshed voids through connecting tubes.

6. The method of claim 4 wherein the performing step additionally comprises the step of meshing interior voids with a midpoint subdivision, pave-and-sweep, or T-Hex procedure.

7. The method of claim 4 wherein the performing step additionally comprises the step of sweeping the connecting tubes between voids and out to the boundaries.

8. The method of claim 4 wherein the performing step additionally comprises the step of splitting connecting webs.

9. The method of claim 1 wherein the advancing step comprises advancing an incomplete front.

10. The method of claim 1 wherein the performing step additionally comprises the step of merging and seaming colliding fronts.

11. The method of claim 1 wherein the performing step additionally comprises the step of merging and employing triangle patterns to resolve colliding fronts.

12. A computer-readable storage medium having stored thereon machine-readable code that, when executed, direct a computer to generate a conformal all quadrilateral or hexahedral mesh representing a corresponding physical item, said code comprising:

code for selecting an object representing the physical item with unmeshed boundaries; and code iterating while unmeshed voids are larger than twice a desired element size and unrecognizable as either a midpoint subdividable or pave-and-sweepable polyhedra, said iterative code comprising:

code for selecting a front of a plurality of fronts to advance;

code for determining, based on sizes of fronts and angles with adjacent fronts, which adjacent fronts should be advanced with the selected front;

code for advancing the selected and determined adjacent fronts;

code for forming quadrilaterals or unconstrained columns of hexahedra where two unconstrained hexahedral layers cross; and code for establishing hexahedral elements where three unconstrained hexahedral layers cross; and code outputting a resulting object that represents the physical item with a conformal all quadrilateral or hexahedral mesh.

13. The computer-readable storage medium of claim 12 wherein the iterating code additionally comprises code for performing layer smoothing and seaming and merging.

14. The computer-readable storage medium of claim 12 wherein the iterating code additionally comprises code for inserting tucks and/or wedges.

15. The computer-readable storage medium of claim 12 wherein the iterating code additionally comprises code for identifying unmeshed voids, connecting tubes, and connecting webs.

16. The computer-readable storage medium of claim 15 wherein the iterating code additionally comprises code for defining constraints between unmeshed voids through connecting tubes.

17. The computer-readable storage medium of claim 15 wherein the iterating code additionally comprises code for meshing interior voids with a midpoint subdivision, pave-and-sweep, or T-Hex procedure.

18. The computer-readable storage medium of claim 15 wherein the iterating code additionally comprises code for sweeping the connecting tubes between voids and out to the boundaries.

19. The computer-readable storage medium of claim 15 wherein the iterating code additionally comprises code for splitting connecting webs.

20. The computer-readable medium storage of claim 12 wherein the advancing code comprises code for advancing an incomplete front.

21. The computer-readable medium storage of claim 12 wherein the iterating code additionally comprises code for merging and seaming colliding fronts.

22. The computer-readable medium storage of claim 12 wherein the iterating code additionally comprises code for merging and employing triangle patterns to resolve colliding fronts.

* * * * *